US009059845B2

(12) United States Patent
Dalsgaard et al.

(10) Patent No.: US 9,059,845 B2
(45) Date of Patent: Jun. 16, 2015

(54) RESOURCE SCHEDULING ENABLING PARTIALLY-CONSTRAINED RETRANSMISSION

(75) Inventors: Lars Dalsgaard, Oulu (FI); Frank Frederiksen, Klarup (DK); Troels E. Kolding, Klarup (DK)

(73) Assignee: Nokia Corporation, Espoo (FI)

( * ) Notice: Subject to any disclaimer, the term of this patent is extended or adjusted under 35 U.S.C. 154(b) by 1263 days.

(21) Appl. No.: 12/228,635

(22) Filed: Aug. 13, 2008

(65) Prior Publication Data

US 2009/0046650 A1    Feb. 19, 2009

Related U.S. Application Data

(60) Provisional application No. 60/955,804, filed on Aug. 14, 2007.

(51) Int. Cl.
*H04W 76/04* (2009.01)
*H04L 1/18* (2006.01)
(Continued)

(52) U.S. Cl.
CPC ............. *H04L 1/1812* (2013.01); *H04W 28/04* (2013.01); *H04W 76/048* (2013.01); *H04L 1/189* (2013.01);
(Continued)

(58) Field of Classification Search
CPC ..... H04L 1/189; H04L 1/1825; H04L 1/1819; H04L 1/1887; H04W 76/048; H04W 28/04; H04W 88/00
See application file for complete search history.

(56) References Cited

U.S. PATENT DOCUMENTS 7,277,390 B2    10/2007    Kang ............................ 370/231
7,292,825 B2    11/2007    Beale et al. ................ 455/67.11
(Continued)

FOREIGN PATENT DOCUMENTS

EP    1 557 968 A1    7/2005
EP    1 638 237 A2    3/2006
(Continued)

OTHER PUBLICATIONS

3GPP TR 25.813 Version 7.1.0 (Sep. 2006), "Technical Specification Group Radio Access Network; Evolved Universal Terrestrial Radio Access (E-UTRA) and Evolved Universal Terrestrial Radio Access Network (E-UTRAN); Radio interface protocol aspects", (Release 7), pp. 1-41.
(Continued)

*Primary Examiner* — Jeffrey M Rutkowski
*Assistant Examiner* — Salvador E Rivas
(74) *Attorney, Agent, or Firm* — Harrington & Smith

(57) ABSTRACT

The exemplary embodiments of the invention utilize techniques that provide an amount of scheduling flexibility for retransmissions (e.g., downlink HARQ retransmissions) while also limiting the amount of time within which a UE can expect retransmissions. Thus, the network retains scheduling flexibility while the UE can still operate in DRX, for example. In one exemplary embodiment, a method includes: receiving an initial transmission of information; and receiving a retransmission of the information, where the retransmission is received within a window of time having a predetermined duration, where the window of time is arranged to begin at a predetermined time or after a predetermined time interval. In further exemplary embodiments, the predetermined duration of the window of time is measured using a DRX retransmission timer and/or the predetermined time or the predetermined time interval is measured using a HARQ RTT timer.

12 Claims, 13 Drawing Sheets

(51) Int. Cl.
*H04W 88/00* (2009.01)
*H04W 28/04* (2009.01)

(52) U.S. Cl.
CPC ............. *H04L 1/1819* (2013.01); *H04L 1/1825* (2013.01); *H04W 88/00* (2013.01); *H04L 1/1822* (2013.01); *H04L 1/1887* (2013.01)

(56) References Cited

U.S. PATENT DOCUMENTS

| | | | |
|---|---|---|---|
| 2003/0028837 A1* | 2/2003 | Oh ............................... | 714/748 |
| 2003/0126238 A1* | 7/2003 | Kohno et al. ................. | 709/220 |
| 2003/0210668 A1 | 11/2003 | Malladi et al. ................ | 370/335 |
| 2004/0120306 A1* | 6/2004 | Wigard et al. ................ | 370/349 |
| 2006/0203723 A1 | 9/2006 | Shirakabe et al. ............ | 370/229 |
| 2007/0177536 A1* | 8/2007 | Brueck et al. ................ | 370/328 |
| 2007/0178875 A1 | 8/2007 | Rao et al. .................... | 455/343.1 |
| 2007/0283032 A1* | 12/2007 | Kim et al. .................... | 709/230 |
| 2007/0286080 A1* | 12/2007 | Kim et al. .................... | 370/236 |
| 2008/0025301 A1 | 1/2008 | Lenzini et al. ............... | 370/389 |
| 2008/0037664 A1 | 2/2008 | Yang et al. .................. | 375/260 |
| 2008/0043619 A1 | 2/2008 | Sammour et al. ............ | 370/231 |
| 2008/0045255 A1 | 2/2008 | Revel et al. .................. | 455/510 |
| 2008/0051098 A1 | 2/2008 | Rao ............................. | 455/452.1 |
| 2008/0144572 A1 | 6/2008 | Makhijani .................... | 370/330 |

FOREIGN PATENT DOCUMENTS

| | | |
|---|---|---|
| EP | 1 845 649 A2 | 10/2007 |
| EP | 1 845 650 A2 | 10/2007 |
| KR | 2003 0008324 A | 1/2003 |
| WO | WO-2004/062205 A1 | 7/2004 |
| WO | WO 2005/071874 A1 | 8/2005 |
| WO | WO-2007/078142 A1 | 7/2007 |

OTHER PUBLICATIONS

3GPP TS 36.300 Version 8.1.0 (Jun. 2007), "Technical Specification Group Radio Access Network; Evolved Universal Terrestrial Radio Access (E-UTRA) and Evolved Universal Terrestrial Radio Access Network (E-UTRAN); Overall description; Stage 2", (Release 8), pp. 1-106.

Nokia Corporation et al., "Stage 3 Description of DRX", 3GPP TSG-RAN WG2 Meeting #60bis, Jan. 14-18, 2008, Sevilla, Spain, R2-080021, the whole document.

Nokia Corporation et al., "Stage 3 Description of DRX V2", 3GPP TSG-RAN WG2 Meeting #60bis, Jan. 14-18, 2008, Sevilla, Spain, R2-080552, the whole document.

* cited by examiner

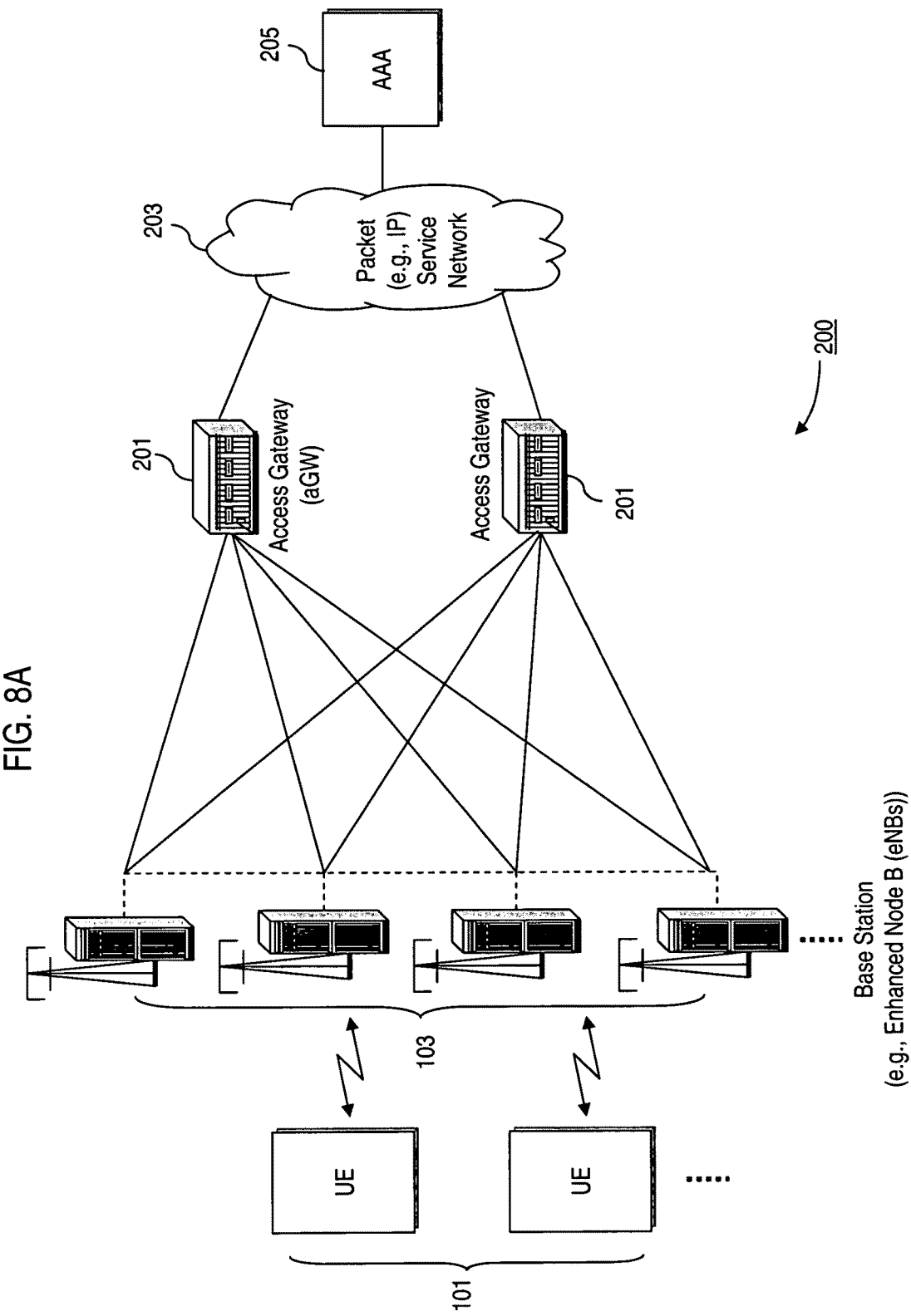

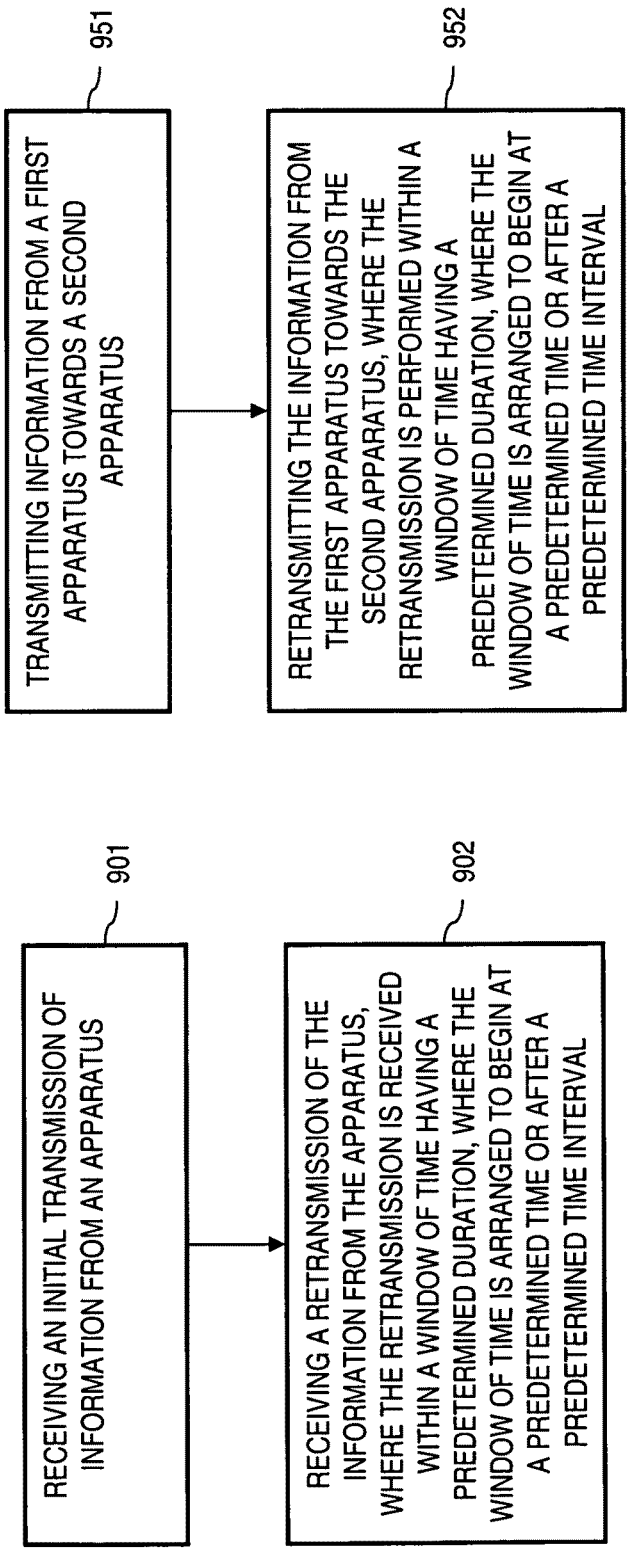

RESOURCE SCHEDULING ENABLING PARTIALLY-CONSTRAINED RETRANSMISSION

CROSS-REFERENCE TO RELATED APPLICATIONS

This patent application claims priority under 35 U.S.C. §119(e) from U.S. Provisional Patent Application No. 60/955,804, filed Aug. 14, 2007, the disclosure of which is incorporated by reference herein in its entirety.

TECHNICAL FIELD

The exemplary and non-limiting embodiments of this invention relate generally to wireless communication systems, apparatus, methods and computer program products and, more specifically, relate to resource scheduling for retransmissions, such as HARQ retransmissions, as a non-limiting example.

BACKGROUND

The following abbreviations are utilized herein:
3GPP third generation partnership project
AAA access, authorization and accounting (server)
ACK acknowledgement
ADC analog to digital converter/conversion
AGC automatic gain control
aGW access gateway
AN access node
ARQ automatic repeat-request
ASIC application specific integrated circuit
AT allocation table
ATM asynchronous transfer mode
BS base station
CDMA code division multiple access
CRC cyclic redundancy check
DAC digital to analog converter/conversion
DL downlink (Node B to UE)
DRX discontinuous reception
DSP digital signal processor
DTX discontinuous transmission
eNB E-UTRAN Node B (evolved/enhanced Node B)
EPROM erasable programmable read-only memory
E-UTRAN evolved universal terrestrial radio access network
FDMA frequency division multiple access
FEC forward error correction
FPGA field programmable gate array
GGSN gateway GPRS support node
GPRS general packet radio service
HARQ hybrid automatic repeat-request
IEEE institute of electrical and electronics engineers
IP internet protocol
IR infrared
LDPC low density parity check
LTE long term evolution of UTRAN (E-UTRAN)
MAC medium access control (layer 2, L2)
MCS modulation and coding scheme
MM mobility management
MME mobile management entity
MS mobile station
NACK negative acknowledgement
Node B base station
OFDMA orthogonal frequency division multiple access
PCMCIA personal computer memory card international association
PDCCH physical downlink control channel
PDCP packet data convergence protocol
PDSCCH physical downlink shared control channel
PHY physical layer (layer 1, L1)
PROM programmable read-only memory
PSTN public switched telephone network
RAM random access memory
RB radio bearer
Re-TX retransmission
RF radio frequency
RLC radio link control
ROM read-only memory
RRC radio resource control
RRM radio resource management
RX reception
SAE system architecture evolution of UTRAN
SAW stop-and-wait
SC-FDMA single carrier-frequency division multiple access
SFN system frame number
SGSN serving GPRS support node
SIB system information block
SIM subscriber identity module
TDMA time division multiple access
TX transmission
UE user equipment, such as a mobile station or mobile terminal
UL uplink (UE to Node B)
UPE user plane entity
UTRAN universal terrestrial radio access network
VoIP voice over internet protocol
WCDMA wideband code division multiple access
WiMAX worldwide interoperability for microwave access (IEEE 802.16 standard)
WLAN wireless local area network Radio communication systems, such as wireless data networks (e.g., 3GPP LTE systems, spread spectrum systems (e.g., CDMA networks), TDMA networks, WiMAX, etc.), provide users with the convenience of mobility along with a rich set of services and features. This convenience has spawned significant adoption by an ever growing number of consumers as an accepted mode of communication for business and personal use. To promote greater adoption, the telecommunication industry, from manufacturers to service providers, has agreed to develop standards for communication protocols that underlie the various services and features. One area of effort involves resource scheduling, for example, to correct transmission errors and ensure accurate delivery of data.

There are various error control mechanisms that can be utilized by wireless communication systems. These mechanisms may be useful in detecting the presence of errors (e.g., incomplete or corrupt receptions) and in addressing errors (e.g., retransmission of messages and/or data).

As a non-limiting example, one such error control mechanism is HARQ. HARQ is a variation of the ARQ error control. With ARQ, error-detection information (ED) bits are added to data to be transmitted (e.g., a CRC). With HARQ, FEC bits are also added to the existing ED bits (e.g., a Reed-Solomon code, a Turbo code, a LDPC code). Various types of HARQ may involve the transmission of the ED bits and/or the FEC bits, possibly over multiple transmissions. The ED bits and the FEC bits enable a receiver to determine if there are errors with received transmissions. If a transmission is incorrectly received, the receiver may indicate this to the transmitter (e.g., via a NACK) and request retransmission of the incorrectly-received message. Upon receipt of the indication and/or request, the transmitter can retransmit the same message or another message containing the same data and/or information. If a transmission is correctly received, a receiver may indicate this to the transmitter (e.g., via an ACK) and there may be no need for retransmission.

As a result of HARQ using the additional FEC bits, in poor signal conditions HARQ tends to perform better (e.g., with better accuracy) than ordinary ARQ. In some cases, the improved performance of HARQ may come at the expense of lower throughput, even in good signal conditions (e.g., Type I HARQ). In other cases, HARQ may be used without further adversely affecting throughput in comparison with ordinary ARQ (e.g., Type II HARQ).

SUMMARY

The below summary section is intended to be merely exemplary and non-limiting.

In one exemplary embodiment of the invention, a method comprising: receiving an initial transmission of information from an apparatus; and receiving a retransmission of the information from the apparatus, where the retransmission is received within a window of time having a predetermined duration, where the window of time is arranged to begin at a predetermined time or after a predetermined time interval.

In another exemplary embodiment of the invention, a program storage device readable by a machine, tangibly embodying a program of instructions executable by the machine for performing operations, said operations comprising: receiving an initial transmission of information from an apparatus; and receiving a retransmission of the information from the apparatus, where the retransmission is received within a window of time having a predetermined duration, where the window of time is arranged to begin at a predetermined time or after a predetermined time interval.

In another exemplary embodiment of the invention, an apparatus comprising: a receiver configured to receive an initial transmission from another apparatus and to receive a retransmission of the information from the apparatus, where the retransmission is received within a window of time having a predetermined duration, where the window of time is arranged to begin at a predetermined time or after a predetermined time interval; and a memory configured to store the information received via the retransmission.

In another exemplary embodiment of the invention, an apparatus comprising: first means for receiving an initial transmission of information from another apparatus; and second means for receiving a retransmission of the information from the other apparatus, where the retransmission is received within a window of time having a predetermined duration, where the window of time is arranged to begin at a predetermined time or after a predetermined time interval.

In another exemplary embodiment of the invention, a method comprising: transmitting information from a first apparatus towards a second apparatus; and retransmitting the information from the first apparatus towards the second apparatus, where the retransmission is performed within a window of time having a predetermined duration, where the window of time is arranged to begin at a predetermined time or after a predetermined time interval.

In another exemplary embodiment of the invention, a program storage device readable by a machine, tangibly embodying a program of instructions executable by the machine for performing operations, said operations comprising: transmitting information from the machine towards an apparatus; and retransmitting the information from the machine towards the apparatus, where the retransmission is performed within a window of time having a predetermined duration, where the window of time is arranged to begin at a predetermined time or after a predetermined time interval.

In another exemplary embodiment of the invention, an apparatus comprising: a memory configured to store information; and a transmitter configured to transmit the information from the apparatus towards another apparatus and to retransmit the information from the apparatus towards the other apparatus, where the retransmission is performed within a window of time having a predetermined duration, where the window of time is arranged to begin at a predetermined time or after a predetermined time interval.

In another exemplary embodiment of the invention, an apparatus comprising: means for transmitting information from the apparatus towards a second apparatus; and means for retransmitting the information from the apparatus towards the second apparatus, where the retransmission is performed within a window of time having a predetermined duration, where the window of time is arranged to begin at a predetermined time or after a predetermined time interval.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIGS. 8A and 8B are diagrams of an exemplary LTE communication system in which the components of FIGS. 2, 3, 4 and/or 7 (e.g., the UE and/or the eNB) can operate in accordance with various exemplary embodiments of the invention;

FIG. 9A depicts a flowchart illustrating another non-limiting example of a method, computer program and/or process for practicing the exemplary embodiments of this invention;

FIG. 9B shows a flowchart illustrating another non-limiting example of a method, computer program and/or process for practicing the exemplary embodiments of this invention;

DETAILED DESCRIPTION

There are two modes of HARQ that are considered in further detail below: synchronous HARQ and asynchronous HARQ. Synchronous HARQ means that the network (e.g., the packet scheduler) is restricted in time when allocating resources for retransmissions. In this case, the network may wish to reuse one or more current allocations either with (adaptive/scheduled synchronous) or without (non-adaptive/unscheduled synchronous) changes. For example, a new transmission (e.g., a HARQ retransmission) may be set for a predetermined time and/or frequency after the first transmission (non-adaptive/unscheduled synchronous). Alternatively, if allocation details have changed (adaptive/scheduled synchronous), the network may wish to provide new allocation resources for the UE (e.g., signaled to the UE via the PDCCH), for example, by signaling the UE at a predetermined time and/or frequency after a first transmission/scheduling. The UE would only need to listen to the PDCCH transmissions that are available (if any) at certain time instants (e.g., the scheduled times that are known, for example, a priori).

In contrast, when using asynchronous HARQ the scheduler is not obliged to satisfy timing requirements with respect to the scheduling of resources for UE HARQ retransmissions. In this case, each UE likely would need to listen for all of the DL PDCCH transmissions (i.e., for all of the time periods) in order to receive the resource allocation for that UE's HARQ retransmission(s).

From the perspective of the UE, synchronous HARQ is simple and allows for power saving since there are predetermined time periods (e.g., a certain subframe) during which the UE listens for PDCCH transmissions. However, this scheme restricts the scheduling freedom of the packet scheduler in the network, potentially increasing the amount of retransmissions. If the amount of retransmissions is increased, this would cause an increase in UE power consumption (e.g., for reception of an increased number of retransmissions). From the scheduler's/network's point of view, one benefit of non-adaptive/unscheduled synchronous retransmission is that there is no need to use any PDCCH resources for scheduling of retransmissions since the timing and/or frequency (e.g., resources, MCS) are predetermined and known in advance.

As mentioned above, asynchronous HARQ provides flexibility in scheduling, for example, in assigning resources for retransmission. For the UE, this approach is sub-optimal as it does not allow for advanced power reduction algorithms. Since the UE is continuously decoding the PDCCH to determine when retransmissions occur and which resources are allocated for the retransmissions, asynchronous HARQ generally may incur increased power consumption for the UE.

Figure 1:
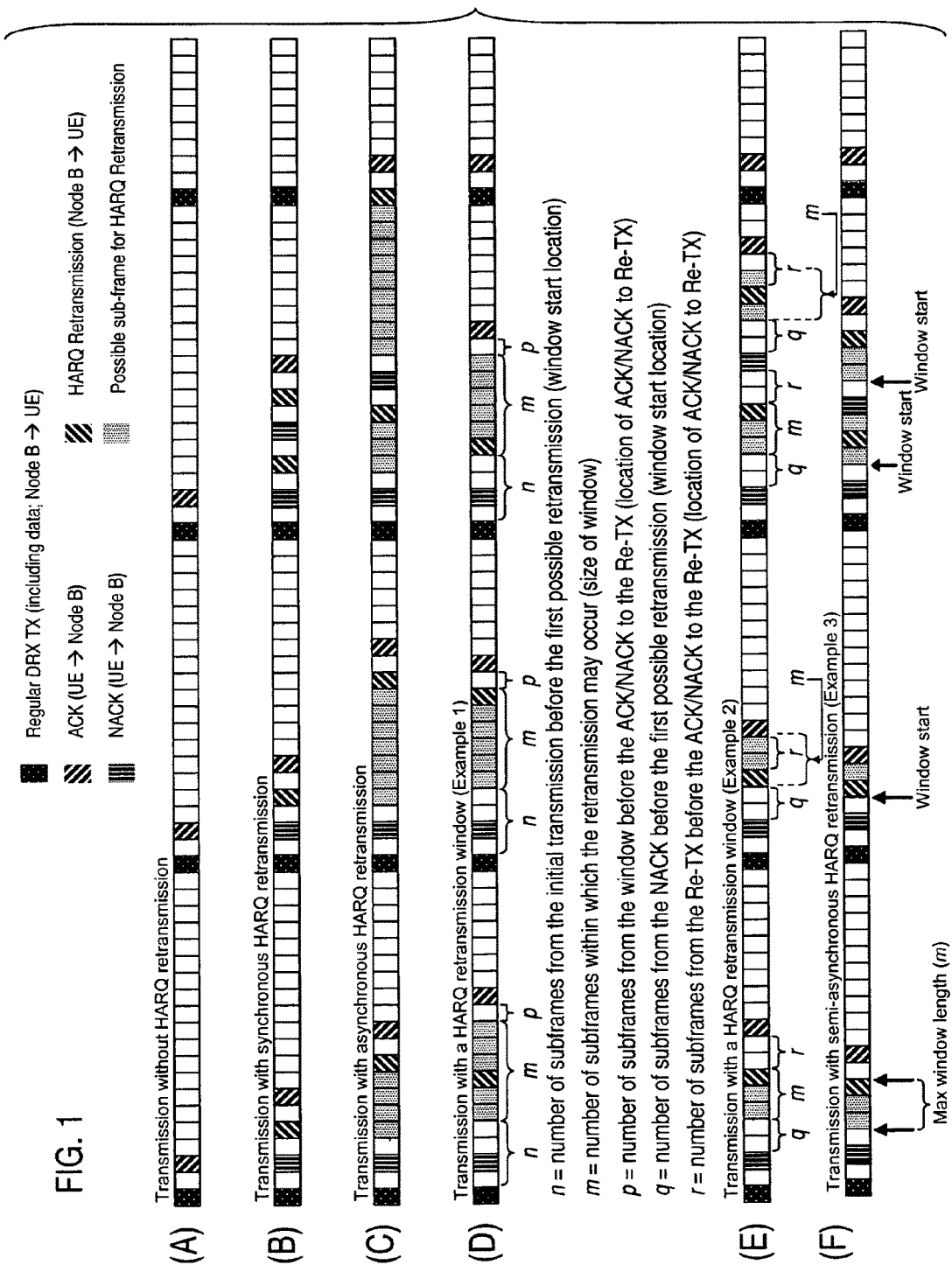
FIGS. 1A-1F depict various exemplary resource scheduling schemes that can utilize HARQ retransmission.

FIGS. 1A-1F depict various exemplary resource scheduling schemes that can utilize HARQ retransmission. These figures show series of subframes with the different transmissions, ACK/NACKs and retransmissions denoted. FIGS. 1A-1C show three exemplary resource scheduling schemes that do not utilize aspects of the exemplary embodiments of the invention. In contrast, FIGS. 1D-1F illustrate exemplary resource scheduling schemes in accordance with exemplary embodiments of the invention.

It is noted that in FIGS. 1A-1F, it is assumed that the regular DRX equals 20 ms and HARQ retransmissions are performed independently from the regular DRX scheduling. It is also assumed that the number of HARQ SAW channels is 4 (e.g., based on the delay between a first transmission and the first possible HARQ retransmission). To retain simplicity in implementation, the periodicity is such that the HARQ retransmissions, or at least one HARQ retransmission, can be completed before the next regular DRX activity occurs (i.e., the next regular transmission). If this is not the case, the book-keeping for HARQ would increase, and the general concept of DRX may increase in complexity. These assumptions are non-limiting, and some exemplary embodiments may deviate from the assumptions, since the exemplary embodiments of the invention may be utilized in conjunction with other types of systems and other arrangements of components.

FIG. 1A shows transmission without any associated HARQ retransmission. FIG. 1B illustrates transmission with synchronous HARQ retransmission. FIG. 1C depicts transmission with asynchronous HARQ retransmission.

As is apparent, with synchronous HARQ retransmission (FIG. 1B) the Node B is generally constrained regarding when retransmissions may occur (e.g., when retransmissions may be scheduled). In FIG. 1B, HARQ retransmissions occur during the second subframe following a NACK. The Node B cannot vary from this timing as it is inflexible. However, the UE knows exactly when HARQ retransmissions will occur and that they occur in a rapid manner (e.g., immediately following a NACK). Thus, the UE can readily enter DRX once the HARQ retransmission has been correctly received (e.g., an ACK is sent for the HARQ retransmission), said correct reception occurring as soon as possible.

With asynchronous HARQ retransmission (FIG. 1C), the Node B is free to schedule HARQ retransmissions whenever desired. In FIG. 1C, HARQ retransmissions occur in any subframe that is at least the second subframe following a NACK. Note that if the Node B delays long enough, the HARQ retransmission may interfere with the next regular DRX transmission. Further note that as illustrated in FIG. 1C, the UE cannot go into DRX after a NACK until the HARQ retransmission has been correctly received (e.g., an ACK is sent for the HARQ retransmission). Clearly this results in increased power consumption for the UE.

Note that in each of the above-described cases (FIGS. 1A-1C), the UE signals an ACK to the Node B upon successful reception of either the initial transmission or the retransmission. If the transmission or retransmission is incorrectly received, the UE may signal a NACK to the Node B indicating that additional retransmission may be desired and/or needed. The various specifics concerning this usage of the ACK/NACK system may be dependent on the system architecture, the system components or one or more guidelines, rules or standards, as non-limiting examples. In some exemplary embodiments, it may be desirable for the ACK/NACK particulars to be known by the UE and the Node B prior to the initial transmission (e.g., a priori, specified by one or more standards, established customs or usage). One of ordinary skill in the art will appreciate the various options available with respect to ACK/NACK schemes and arrangements, such as the exemplary ones described and utilized herein.

Thus, there is a need to provide efficient resource scheduling which can be utilized in conjunction with pre-existing standards and protocols and which addresses the above-noted short-comings (e.g., provides some flexibility for the Node B while enabling the UE to utilize DRX and/or to know when HARQ retransmissions will occur).

The exemplary embodiments of the invention utilize techniques that provide an amount of scheduling flexibility for retransmissions while also limiting the amount of time within which the UE can expect retransmissions. In such a manner, the network has some flexibility in scheduling while the UE can still operate in DRX, for example.

While described below with specific reference to HARQ techniques and HARQ retransmissions, the exemplary embodiments of the invention are not limited thereto, and may be utilized in conjunction with other transmission or retransmission techniques. Similarly, while described below with respect to a BS (e.g., a Node B, an eNB) transmitting and/or retransmitting to a UE (e.g., a DL communication, a DL HARQ retransmission), the exemplary embodiments of the invention are not limited thereto, and may be utilized in conjunction with other devices, communications, systems and/or arrangements. As a non-limiting example, the exemplary embodiments of the invention may be utilized in conjunction with one or more transmissions and/or retransmission to a BS (e.g., a Node B, an eNB) from a UE (e.g., an UL communication, an UL HARQ retransmission). In other exemplary embodiments, different apparatus or devices may be utilized, for example, with respect to UL or DL transmissions or retransmissions.

Furthermore, while described below with respect to an ACK/NACK arrangement for confirming correct reception of a transmission, the exemplary embodiments of the invention are not limited thereto, and may be utilized in conjunction with other arrangements or techniques (e.g., without an ACK/NACK arrangement). In addition, while the below exemplary systems are described in reference to subframes, any suitable division, time apportionment or scale may be utilized, such as frames, time slots, resource blocks, milliseconds or bytes, as non-limiting examples. It should also be noted that any references below to a "window" are referring to the retransmission window, as described herein. Furthermore, any references below to a "location" of an item should be interpreted as relating to a time for the item (e.g., a scheduled time for a transmission, retransmission or reception as governed by a resource allocation). As non-limiting examples, the location may be specified in relation to one or more other items (e.g., relative to a transmission, a reception or a window) or it may be specified in view of a certain time (e.g., an absolute or synchronized time).

In one non-limiting exemplary embodiment, retransmissions are scheduled to occur within a predetermined window of time. The retransmission window is known by both the Node B and the UE such that the Node B can schedule retransmissions suitably (i.e., to occur during the retransmission window) and the UE knows when it has to monitor the channel to receive retransmissions and when it does not have to monitor the channel (e.g., the UE can consistently use DRX).

While both the Node B and the UE are aware of the retransmission window, in some exemplary embodiments the Node B may signal one or more parameters, timers or values (e.g., at least two parameters) to the UE in order to inform the UE of the retransmission window characteristics (e.g., location, width). In further exemplary embodiments, the Node B can configure or reconfigure the retransmission window and signal the retransmission window information to the UE. In other exemplary embodiments, aspects (e.g., characteristics) of the retransmission window may be specified by one or more guidelines, rules and/or standards such that both the Node B and the UE are aware of the retransmission window characteristics a priori (i.e., without any signaling).

FIGS. 1D-1F depict various exemplary resource scheduling schemes utilizing HARQ retransmissions that incorporate aspects of the exemplary embodiments of the invention. As with FIGS. 1A-1C, these figures show series of subframes with the different transmissions, ACK/NACKs and retransmissions denoted.

FIG. 1D (example 1) illustrates one exemplary usage of a HARQ retransmission window in accordance with aspects of the exemplary embodiments of the invention. As shown in FIG. 1D, the retransmission window is specified by two pieces of information: a location of the window and a size of the window. As a non-limiting example, the location may be specified in reference to the initial transmission. For example, it may be specified that n subframes after the initial transmission must pass before the first possible retransmission (i.e., the start of the retransmission window, the first subframe available for retransmission). As a non-limiting example, the size of the window may be specified by a number of subframes. For example, it may be specified that there are m possible, contiguous subframes within which the retransmission may occur.

In FIG. 1D, n=4 and m=6. Note that the retransmission may occur in (e.g., be scheduled for) any of the 6 subframes of the window, including the first and/or last subframe of the window. One can see that the window is located at a same location relative to each initial transmission (i.e., n=4 subframes between the initial transmission and the start of the window).

In a further non-limiting exemplary embodiment, and as shown in FIG. 1D, upon successful/unsuccessful reception of the retransmission (e.g., within the retransmission window), the UE signals an ACK/NACK to the Node B in a certain subframe following the window. For example, it may be specified that p subframes after the retransmission window must pass before the ACK/NACK to the retransmission is signaled. In example 1 (FIG. 1D), p=1. In other exemplary embodiments, the UE may signal an ACK/NACK for the retransmission in a different location (i.e., at a different time) and/or in a location relative to a different transmission, reception or action. In further exemplary embodiments, the UE may acknowledge successful/unsuccessful reception using a different technique or arrangement (i.e., one other than an ACK/NACK arrangement).

FIG. 1E (example 2) illustrates another exemplary usage of a HARQ retransmission window incorporating aspects of the exemplary embodiments of the invention. Similar to example 1 in FIG. 1D, the retransmission window is specified by two pieces of information: a location of the window and a size of the window. However, in FIG. 1E the location of the window is specified in reference to transmission or reception of the NACK that is signaled by the UE to the Node B. For example, it may be specified that q subframes after the NACK must pass before the first possible retransmission (i.e., the start of the retransmission window, the first subframe available for retransmission). Similar to FIG. 1D, the size of the window is specified by a number m of subframes, indicating that there are m possible, contiguous subframes within which the retransmission may occur.

In FIG. 1E, q=2 and m=3. Note that the retransmission may occur in (e.g., be scheduled for) any of the 3 subframes of the window, including the first and/or last subframe of the window. One can see that the window is located at a same location relative to each NACK (i.e., q=2 subframes between the NACK and the start of the window).

In a further non-limiting exemplary embodiment, and as shown in FIG. 1E, upon successful/unsuccessful reception of the retransmission (e.g., within the retransmission window), the UE signals an ACK/NACK to the Node B in a certain subframe following the retransmission. For example, it may be specified that r subframes after the retransmission must pass before the ACK/NACK to the retransmission is signaled. In example 2 (FIG. 1E), r=2. This is in contrast to example 1 (FIG. 1D), as noted above, wherein the ACK/NACK is signaled in the second subframe (p=1; one subframe after the retransmission window must pass before the ACK/NACK to the retransmission is signaled) following the retransmission window. In further exemplary embodiments, one or more values for the different parameters may be the same as one or more values for other parameters. For example, and as shown in FIG. 1E, the value for q may be the same as the value for r (q=r=2).

Note that the retransmission parameters (e.g., the location and window size) of example 2 (FIG. 1E) are such that the UE and Node B are capable of implementing a second window for a second retransmission attempt prior to the next scheduled regular transmission (e.g., the next regularly-scheduled transmission, regular DRX TX). As a non-limiting example, the second window may be utilized in response to unsuccessful reception by the UE of a first retransmission attempt. While shown in FIG. 1E in reference to two non-overlapping windows, other exemplary embodiments may be operable (configured) to implement at least two windows (e.g., HARQ retransmission windows) that partially overlap (e.g., based on the particular parameters chosen for and/or used by the UE and/or Node B).

It is further noted that the availability of more than one retransmission window is not required for the exemplary embodiments of the invention, though some exemplary embodiments may be configured to implement such a plurality of windows, for example, automatically (e.g., in response to a sufficient amount of time being available), selectively (e.g., controlled by the Node B, for example, via signaling with the UE, for example, via the PDCCH) or always (e.g., specified by a guidelines, rule or standard such that a plurality of windows is always available if needed).

In further exemplary embodiments, more than two retransmission windows may occur before the next regularly-scheduled transmission. In other exemplary embodiments, the retransmission window may be arranged such that only one retransmission window can occur prior to the next regularly-scheduled transmission. In further exemplary embodiments, such an arrangement may be used in order to maximize the possible number of subframes for the retransmission (e.g., maximize the size of the window). In other exemplary embodiments, such an arrangement may be used in order to maximize the possible number of subframes for the retransmission (e.g., maximize the size of the window) while still enabling the UE to send an ACK/NACK in response to the retransmission attempt.

It should be observed that maximizing the retransmission window (e.g., as in the above-described further exemplary embodiments) may have an adverse effect on UE power consumption since the UE may have an increased amount of time (e.g., number of subframes) to monitor for the retransmission. However, it may be the case that the Node B is able to take this factor into account, for example, by enacting a guideline or rule. As a non-limiting example, it may be the case that the Node B uses the earliest possible subframe of the retransmission window for the retransmission (e.g., in view of other factors, such as other transmissions and/or other receptions, for example). Such exemplary embodiments may be particularly useful in conjunction with the ACK/NACK being signaled within a certain number r of subframes of the retransmission, as in example 2 (FIG. 1E).

In some exemplary embodiments, one or more properties/characteristics (e.g., size, location) of the retransmission window may be related to, a function of and/or dependent on the period of the regularly-scheduled transmissions (i.e., the amount of time between regularly-scheduled transmissions, such as a number of subframes or time slots, as non-limiting examples). For example, the retransmission window may be configured to maximize the size of the window while enabling up to two retransmission windows to occur between the regularly-scheduled transmissions (e.g., assuming a periodic regular transmission, such as with a semi-persistent, semi-permanent, non-temporary, static or semi-static allocation, as non-limiting examples).

FIG. 1F (example 3) illustrates another exemplary usage of a HARQ retransmission window in accordance with aspects of the exemplary embodiments of the invention. Example 3 (FIG. 1F), as well as various other exemplary embodiments of the invention, may be referred to as transmission with semi-synchronous or time-limited asynchronous (HARQ) retransmission. In FIG. 1F, the maximum window length (m) is 3 subframes and the ACK/NACK for the retransmission is signaled in the second subframe following the retransmission (r=1), similar to example 2 (FIG. 1E).

In other exemplary embodiments, a different structure for the retransmission window characteristics may be utilized. For example, the retransmission window may not be comprised of contiguous (consecutive, neighboring, adjacent) subframes. In such an example, the start location and size of the retransmission window may be insufficient or immaterial and/or additional information may be needed and/or signaled.

Various ones of the exemplary embodiments of the invention are described above in reference to one or more parameters (e.g., n, m, p, q, r). It should be noted that these parameters may generally be seen to correspond to different intervals of time (e.g., time intervals, periods of time, time periods, time slots, slots of time, portions of time, times, segments of time, time segments, measurements of time, time measurements, subframes, frames, symbols, OFDM symbols, transmission symbols). As such, some exemplary embodiments of the invention may utilize one or more means for tracking, quantifying, observing and/or measuring time.

As a non-limiting example, one or more timers may be used by the UE and/or Node B in order to track passage of corresponding intervals of time. For example, in order to track a minimum amount of time (e.g., number of subframes) before a retransmission (e.g., a DL HARQ retransmission) is expected by the UE, a HARQ RTT Timer may be used. The HARQ RTT Timer tracks the amount of time that must pass before the first possible retransmission (e.g., corresponding to the start window location; indicative of an earliest time (e.g., frame, subframe) that the UE can expect a retransmission), and may generally be seen to correspond to parameter n (i.e., a number of subframes from the initial transmission before the first possible retransmission) or parameter q (i.e., number of subframes from the NACK before the first possible retransmission), as non-limiting examples.

As another example, in order to track a maximum amount of time (e.g., a maximum number of consecutive subframes, a maximum number of consecutive PDCCH subframes) for as soon as a DL retransmission is expected by the UE, a DRX Retransmission Timer may be used. The DRX Retransmission Timer tracks the amount of time (e.g., number of subframes, number of PDCCH subframes) that the UE monitors for a retransmission (e.g., a DL HARQ retransmission), and may generally be seen to correspond to parameter m (number of subframes within which the retransmission may occur; retransmission window size), as a non-limiting example.

In one non-limiting, exemplary embodiment, an apparatus (e.g., the UE, the Node B) may utilize both the HARQ RTT Timer and the DRX Retransmission Timer. In a further exemplary embodiment, the apparatus may be configured such that the DRX Retransmission Timer begins running once the HARQ RTT Timer has expired. In another exemplary embodiment, if the HARQ RTT Timer expires in a subframe and the data (e.g., in a soft buffer) of the corresponding HARQ process was not successfully decoded, the apparatus starts the DRX Retransmission Timer for the corresponding HARQ process.

Thus, in accordance with exemplary embodiments of the invention, the HARQ retransmission can be handled both in a synchronous and a non-synchronous manner. In some exemplary embodiments, the UE may need to receive information (e.g., an AT, via the PDCCH) in order to know whether its allocation has changed or not. As with persistent allocations and synchronous HARQ retransmission, it is noted that the UE does not in all situations need to read the PDCCH for resource allocation assignment as they may be assigned in a semi-persistent manner. This is valid and useful for the cases where the network does not want to change the allocations already given. However, if the network (e.g., scheduler) desires flexibility and/or to change one or more of the allocation details (e.g., the MCS), the UE can be informed through the PDCCH. In some exemplary embodiments, the UE is assigned a semi-persistent or persistent allocation and/or synchronous HARQ retransmission such that the UE can read the AT prior to transmission.

As for non-synchronous retransmission, in some exemplary embodiments, the UE may need to read the AT in order to know when the retransmission is scheduled (i.e., in addition to receiving an actual resource allocation for regular communication and/or possible changes to a former allocation).

In some exemplary embodiments, a new parameter may be used to inform the UE about the scheduling window for HARQ retransmissions. For the purposes of explanation, the new parameter will be referred to below as y. The network (e.g., an eNB, a network element, a relay station, via a mobile station) can inform the UE of this parameter, which indicates the time duration in which the UE should listen for resource scheduling allocation information (e.g., transmitted via the PDCCH)—for possible scheduling resources associated with HARQ retransmissions. In other exemplary embodiments, the parameter y generally may be seen to correspond to the DRX Retransmission Timer.

As non-limiting examples, the parameter y can be specified in terms of time, frames, amount of scheduling allocations, or another system-specific time. In one exemplary embodiment, the parameter y is expressed as a SFN, a number of HARQ SAW processes or a function of one or more of those numbers. For normal synchronous HARQ, the resource allocation information may be scheduled at a fixed time after the last transmission.

As an example of this approach, consider a scheduling time as x. A certain 'active' reception time for a given HARQ process (i.e., when the UE listens for the allocation for that process) is at those time instances when x=0, as given by:

$$x = \text{SFN} \bmod N.$$

This indicates that every time x=0, the HARQ process N will be scheduled.

With the adjustment parameter y, the x parameter is used in concatenation with the above synchronous HARQ procedure so as to create a window in which the network may schedule the HARQ retransmission. Basically, y indicates to the UE a time duration or period within which the UE should be listening for resource scheduling for a given HARQ retransmission.

Continuing with this example, this suggests that the UE would listen for resource scheduling information when:

$$x=0 \text{ and } x<=y, \text{ which equals: } 0<=x<=y$$

That is, the UE will start listening to the PDCCH at x=0 and will continue to listen until the time when x=y, thus defining a window of time for receiving the HARQ retransmission.

According to one exemplary embodiment, the parameter y may be defined by the network (e.g., the eNB, a network element) and conveyed to the UE, for example, using one of a variety of signaling schemes. For example, such schemes may include: RRC signaling, SIB signaling, or Connection setup (e.g., RRC signaling).

As described elsewhere herein, in addition to parameters x and y, further exemplary embodiments of the invention may utilize one or more additional parameters, such as a parameter z that generally may be seen to correspond to a HARQ RTT Timer. In other exemplary embodiments, the parameters (e.g., parameters x and/or y) may be utilized or implemented by one or more timers (e.g., a DRX Retransmission Timer). Relatedly, in further exemplary embodiments, the parameter z may be utilized or implemented by one or more other timers (e.g., a HARQ RTT Timer). In various exemplary embodiments of the invention, the parameters and/or timers may be utilized by the eNB, the UE or both the eNB and the UE, as non-limiting examples.

Figure 2:
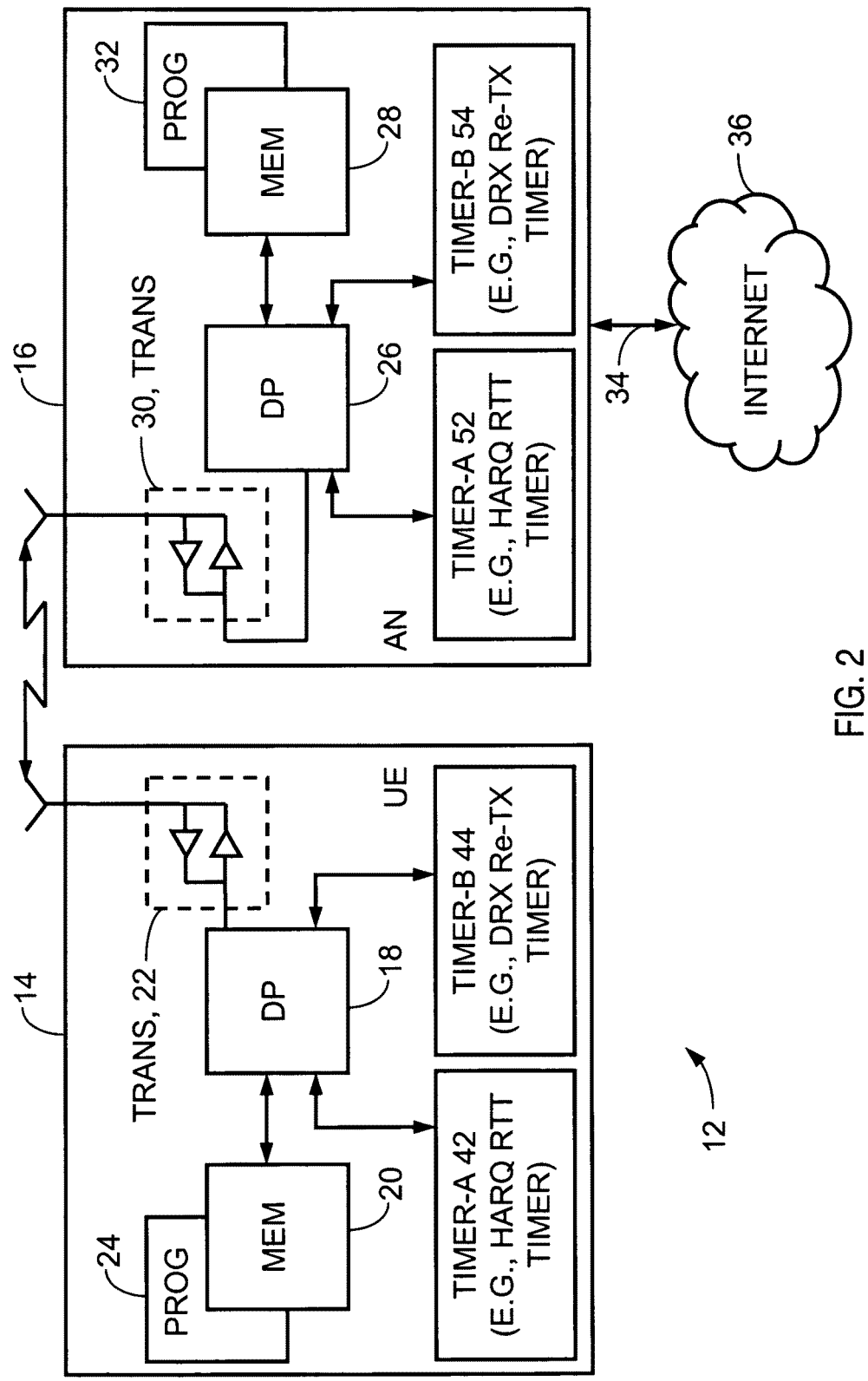
FIG. 2 illustrates a simplified block diagram of various exemplary electronic devices that are suitable for use in practicing the exemplary embodiments of this invention.

Reference is made to FIG. 2 for illustrating a simplified block diagram of various exemplary electronic devices that are suitable for use in practicing the exemplary embodiments of this invention. In FIG. 2, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example. As shown in FIG. 2, the UE 14 may further include one or more timers, such as a timer-A 42 (e.g., a HARQ RTT Timer) and/or a timer-B 44 (e.g., a DRX Retransmission Timer). The one or more timers may be utilized by the UE 14 (e.g., the DP 18) in conjunction with various exemplary embodiments of the invention, as described in further detail herein.

Also as shown in FIG. 2, the AN 16 may further include one or more timers, such as a timer-A 52 (e.g., a HARQ RTT Timer) and/or a timer-B 54 (e.g., a DRX Retransmission Timer). The one or more timers may be utilized by the AN 16

(e.g., the DP 26) in conjunction with various exemplary embodiments of the invention, as described in further detail herein.

In other exemplary embodiments, only one of the UE 14 and the AN 16 includes the timers. As a non-limiting example, only the UE 14 may include the timer-A 42 and the timer-B 44. In further exemplary embodiments, instead of the one or more timers, the UE 14 and/or the AN 16 may comprise one or more parameters (e.g., corresponding to the one or more timers 42, 44, 52, 54), for example, stored in a respective memory of the device (e.g., MEM 20, 28). As non-limiting examples, the one or more parameters may be utilized in order to implement the one or more timers or in order to implement various exemplary embodiments of the invention. In further exemplary embodiments, the one or more parameters may be signaled from the AN 16 towards the UE 14 and/or from the UE 14 towards the AN 16, as non-limiting examples. In other exemplary embodiments, the respective DP 18, 26 comprises and/or implements the respective one or more timers 42, 44, 52, 54. In further exemplary embodiments, the respective one or more timers 42, 44, 52, 54 may be utilized and/or implemented by a respective computer program (e.g., PROG 24, 32), for example, stored in the respective memory (e.g., MEM 20, 28).

In further exemplary embodiments, neither the UE 14 nor the AN 16 includes any timers (e.g., timers 42, 44, 52, 54) for implementing exemplary embodiments of the invention.

At least one of the PROGs 24, 32 is assumed to include program instructions that, when executed by the associated DP, enable the electronic device to operate in accordance with the exemplary embodiments of this invention, as discussed herein.

In general, the various exemplary embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

Figure 3:
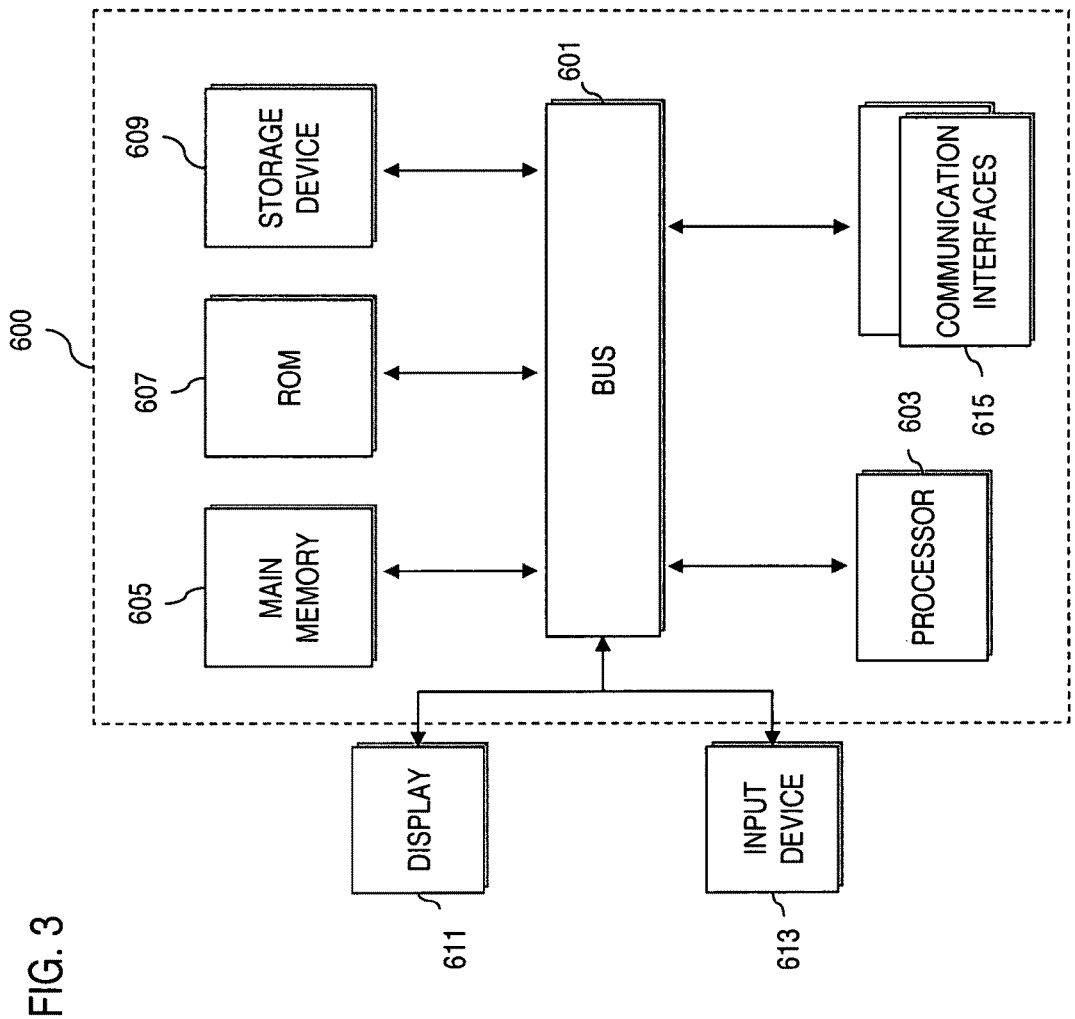
FIG. 3 illustrates exemplary hardware upon which various exemplary embodiments of the invention can be implemented.

FIG. 3 illustrates exemplary hardware upon which various exemplary embodiments of the invention can be implemented. A computing system 600 (e.g., embodied in one or more devices, apparatus, stations, circuits, integrated circuits, chips, processors, computers and/or other systems) includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 4:
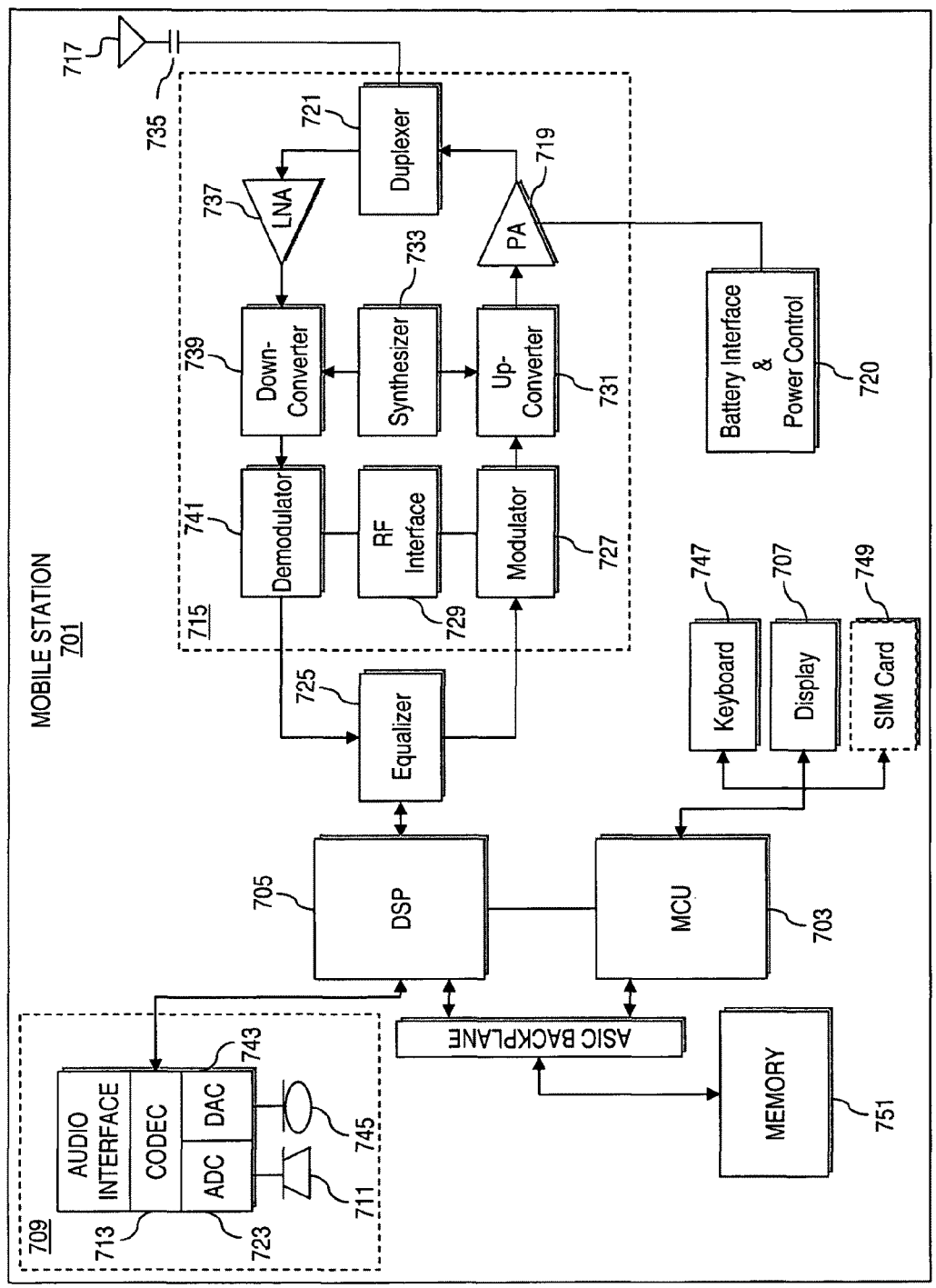
FIG. 4 is a diagram of exemplary components of a mobile station (e.g., a mobile node, a UE, a handset, a mobile phone, a cellular phone) capable of operating in the systems of FIGS. 2, 6, 10A and/or 10B, in accordance with various exemplary embodiments of the invention.
Figure 6:
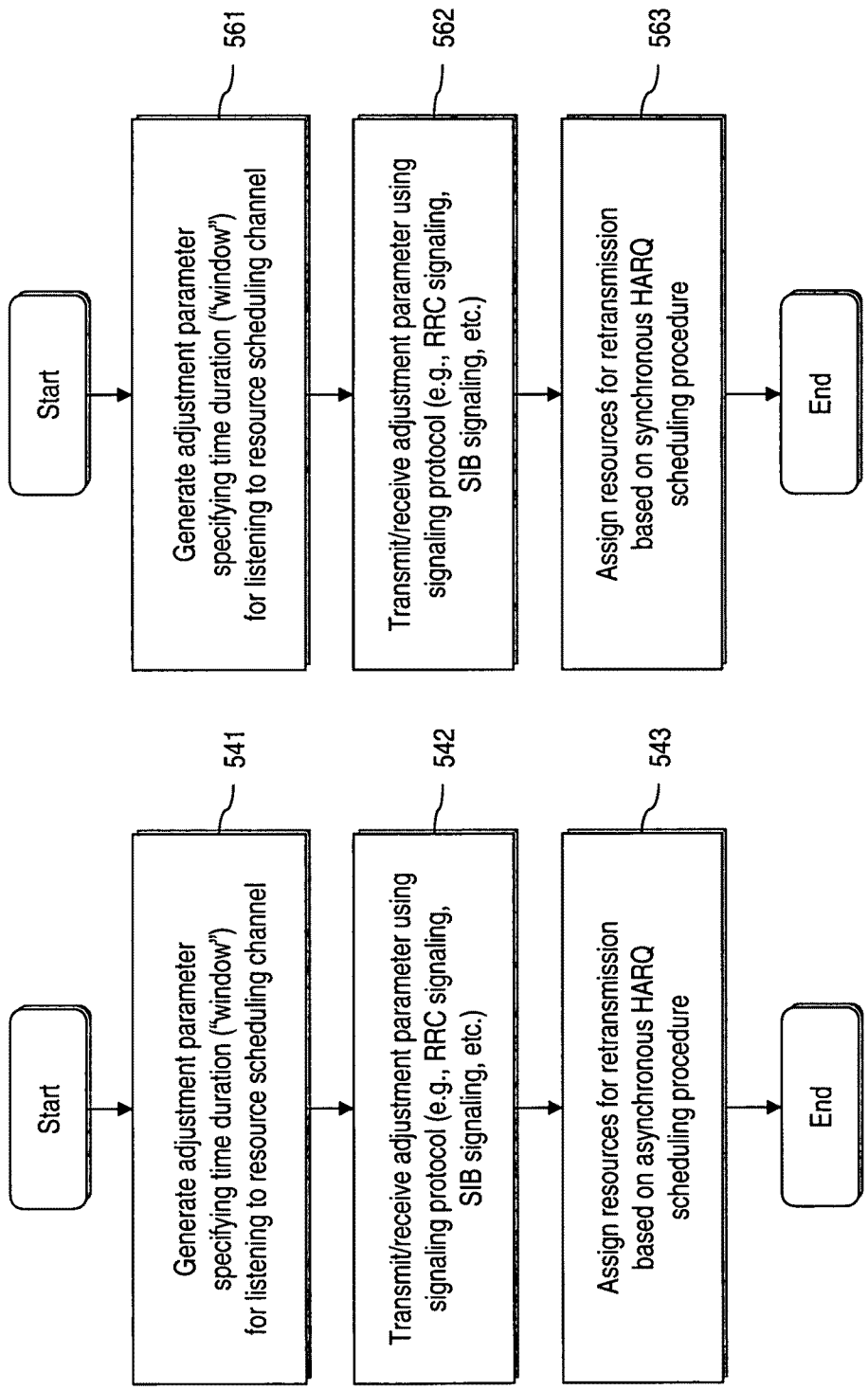
FIG. 6A is a flowchart of a process for providing an adjustment parameter to transition between scheduling modes (synchronous retransmission to asynchronous retransmission) in accordance with exemplary embodiments of the invention.
FIG. 6B is a flowchart of a process for providing an adjustment parameter to transition between scheduling modes (asynchronous retransmission to synchronous retransmission) in accordance with exemplary embodiments of the invention.
Figure 10A:
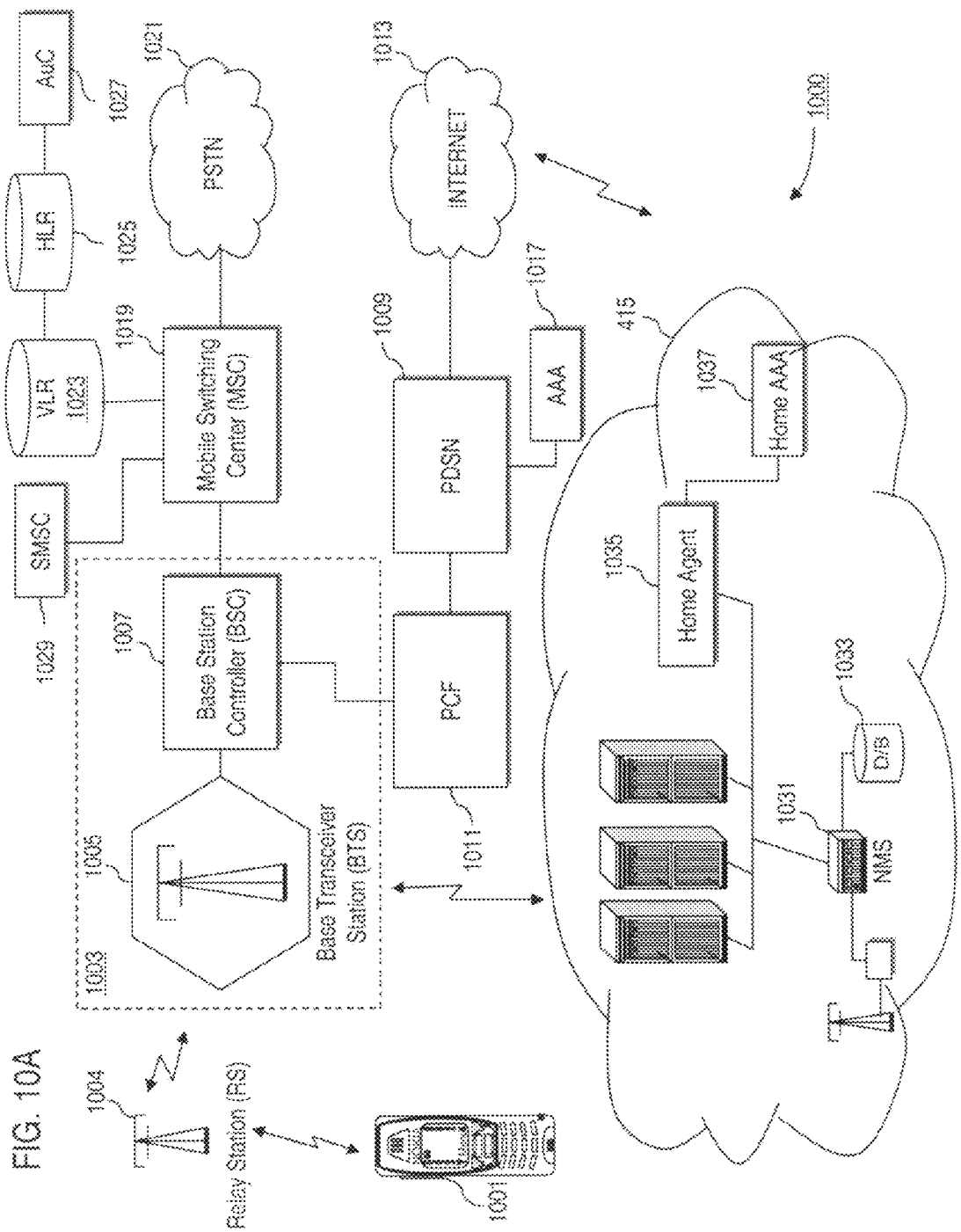
FIGS. 10A and 10B are diagrams of different exemplary cellular mobile phone systems capable of supporting various exemplary embodiments of the invention.

FIG. 4 is a diagram of exemplary components of a mobile station (e.g., a mobile node, a UE, a handset, a mobile phone, a cellular phone) 701 capable of operating in the systems of FIGS. 2, 6, 10A and/or 10B, in accordance with various exemplary embodiments of the invention. Generally, a radio receiver is often defined in terms of front-end and back-end characteristics. The front-end of the receiver encompasses all of the RF circuitry whereas the back-end encompasses all of the base-band processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system (e.g., systems of FIG. 10A or 10B), via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The MCU 703 delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

According to certain exemplary embodiments of the invention, an approach provides an adjust parameter that is used to inform a UE about a scheduling window for retransmissions associated with an error control mechanism (e.g., HARQ), such as one using an asynchronous scheduling scheme. Use of the adjustment parameter effectively limits the scheduling freedom of the asynchronous scheduling scheme to a semi-synchronous scheduling scheme.

Still other exemplary aspects, features, and advantages of the invention are readily apparent from the detailed description, simply by illustrating a number of particular exemplary embodiments and implementations, including the best mode contemplated for carrying out the invention. The invention is also capable of other and different exemplary embodiments, and its several details can be modified in various obvious respects, all without departing from the spirit and scope of the invention. Accordingly, the drawings and description are to be regarded as illustrative in nature, and not as restrictive.

Apparatus, methods, and software (e.g., programs, computer programs, program storage devices or computer-readable mediums storing such program instructions) for providing resource scheduling associated with an error control mechanism are disclosed. In the following description, for purposes of explanation, numerous specific details are set forth in order to provide a thorough understanding of the exemplary embodiments of the invention. It should be apparent, however, to one skilled in the art that the various exemplary embodiments of the invention may be practiced without certain specific details and/or with other equivalent arrangements. In other instances, examples of well-known structures, systems and devices are shown in block diagram form in order to avoid unnecessarily obscuring the exemplary embodiments of the invention.

Although the exemplary embodiments of the invention are discussed below primarily with respect to a wireless network compliant with the 3GPP LTE architecture, it should be recognized by one of ordinary skill in the art that the exemplary embodiments of the invention have applicability to any type of packet based communication system (e.g., the systems of FIGS. 8A and 8B) and equivalent functional capabilities. As non-limiting examples, exemplary embodiments of the invention may be implemented in other suitable CDMA or OFDMA systems.

Figure 5:
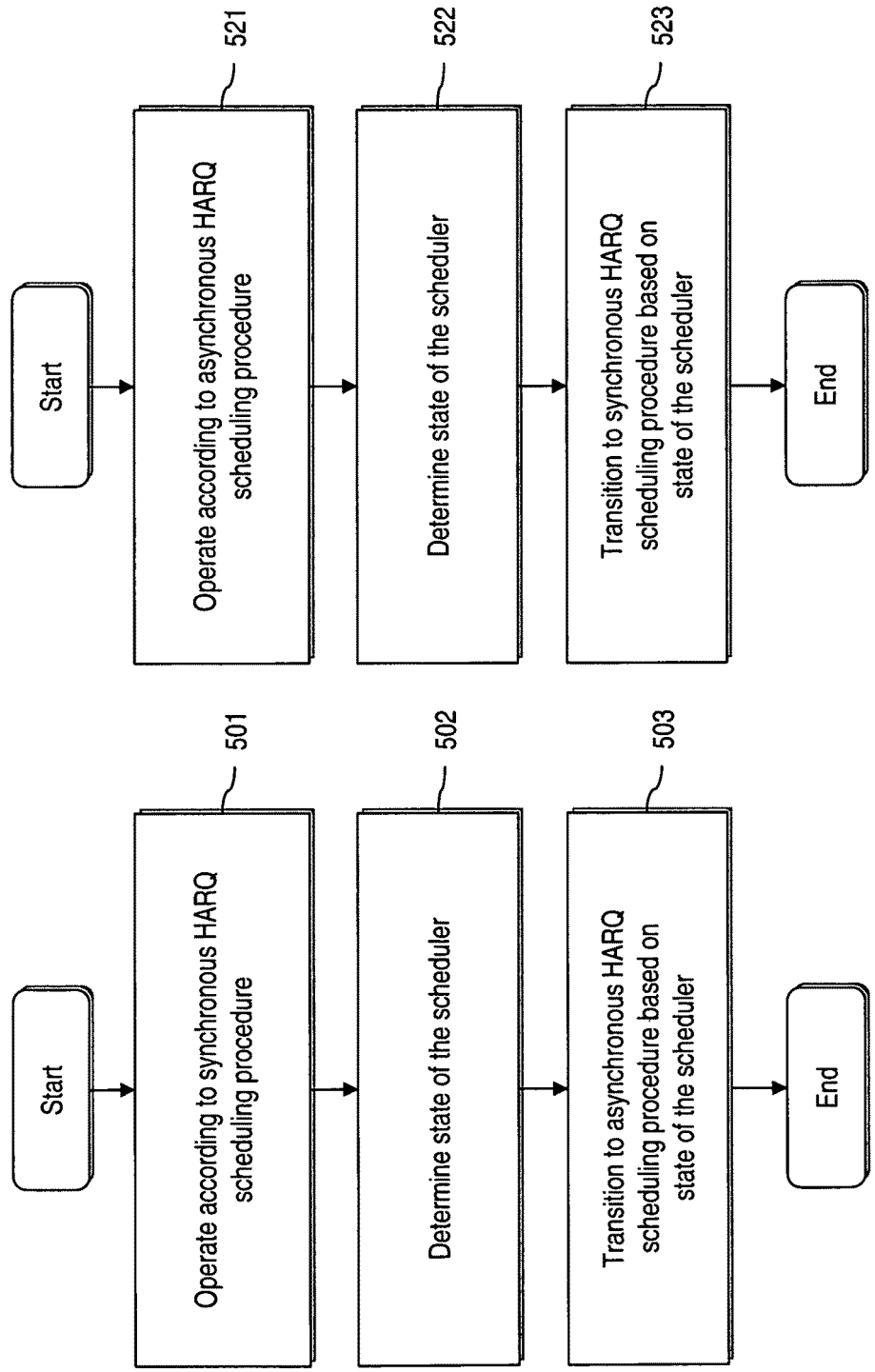
FIG. 5A is a flowchart of an exemplary process for transitioning between synchronous HARQ scheduling to asynchronous HARQ scheduling in accordance with exemplary embodiments of the invention.
FIG. 5B is a flowchart of an exemplary process for transitioning between asynchronous HARQ scheduling to synchronous HARQ scheduling in accordance with exemplary embodiments of the invention.

FIGS. 5A and 5B depict flowcharts of exemplary processes for transitioning between synchronous HARQ scheduling and asynchronous HARQ scheduling in accordance with exemplary embodiments of the invention. When considering HARQ, there are two general types of retransmission scheduling principles: synchronous HARQ retransmission, and asynchronous HARQ retransmission, as described in detail above.

As shown in FIG. 5A, the system may operate according to a synchronous HARQ scheduling procedure, for example (501). The process determines the state of the scheduler, for example, whether the scheduler requires greater flexibility to schedule retransmissions (502). The scheduler can transition to an asynchronous HARQ (retransmission) scheduling procedure (503) and the UE may be notified of an adjustment parameter, for example, as next described in FIG. 6A. This approach provides a flexible transition between the two options, such that scheduling freedom is achieved for the network, while concurrently addressing the power consumption concerns of the UE. As such, this approach has applicability to a wide range of communication applications (e.g., Voice over Internet Protocol (VoIP)) as well as other real-time applications, as non-limiting examples.

Similar to FIG. 5A, FIG. 5B shows a transition from asynchronous HARQ to synchronous HARQ (e.g., time-limited asynchronous HARQ). While initially operating according to an asynchronous HARQ scheduling procedure (521), the process determines the state of the scheduler (522), for example, whether the scheduler can use less flexibility to schedule retransmissions. The scheduler can transition to a synchronous HARQ (retransmission) scheduling procedure (523) and the UE may be notified of an adjustment parameter, for example, as next described in FIG. 6B. This approach provides even more flexibility, while concurrently addressing the power consumption concerns of the UE.

FIG. 6A is a flowchart of an exemplary process for providing an adjustment parameter to transition between scheduling modes in accordance with exemplary embodiments of the invention. According to certain exemplary embodiments, the synchronous HARQ scheduling procedure is improved by adding an additional adjustment parameter. This adjustment parameter is employed to gradually change from a synchronous HARQ mode of operation into asynchronous HARQ. An adjustment parameter is generated (541), for example, for a system that is initially operation using a synchronous retransmission procedure. As a non-limiting example, the adjustment parameter may specify a time duration (e.g., a "window," a start time and/or a stop time) for listening to a resource scheduling channel (e.g., a PDCCH). The adjustment parameter is transmitted from one device (e.g., a Node B or a UE) to another device (e.g., a UE or a Node B) using a signaling protocol, such as RRC signaling or SIB signaling, as non-limiting examples (542). Based on the received adjustment parameter, resources are assigned for asynchronous retransmission, such as for an asynchronous HARQ retransmission scheduling procedure (543).

FIG. 6B is a flowchart of another exemplary process for providing an adjustment parameter to transition between scheduling modes in accordance with further exemplary embodiments of the invention. According to certain exemplary embodiments, the asynchronous HARQ scheduling procedure is improved by adding an additional adjustment parameter. This adjustment parameter is employed to gradually change from an asynchronous HARQ mode of operation into a synchronous HARQ mode, such as the above-described time-limited asynchronous HARQ mode, for example. An adjustment parameter is generated (541), for example, for a system that is initially operation using an asynchronous retransmission procedure. As a non-limiting example, the adjustment parameter may specify a time duration (e.g., a "window," a start time and/or a stop time) for listening to a resource scheduling channel (e.g., a PDCCH). The adjustment parameter is transmitted from one device (e.g., a Node B or a UE) to another device (e.g., a UE or a Node B) using a signaling protocol, such as RRC signaling or SIB signaling, as non-limiting examples (542). Based on the received adjustment parameter, resources are assigned for synchronous retransmission (e.g., a time-limited asynchronous mode), such as for a synchronous HARQ retransmission scheduling procedure (543).

Figure 7:
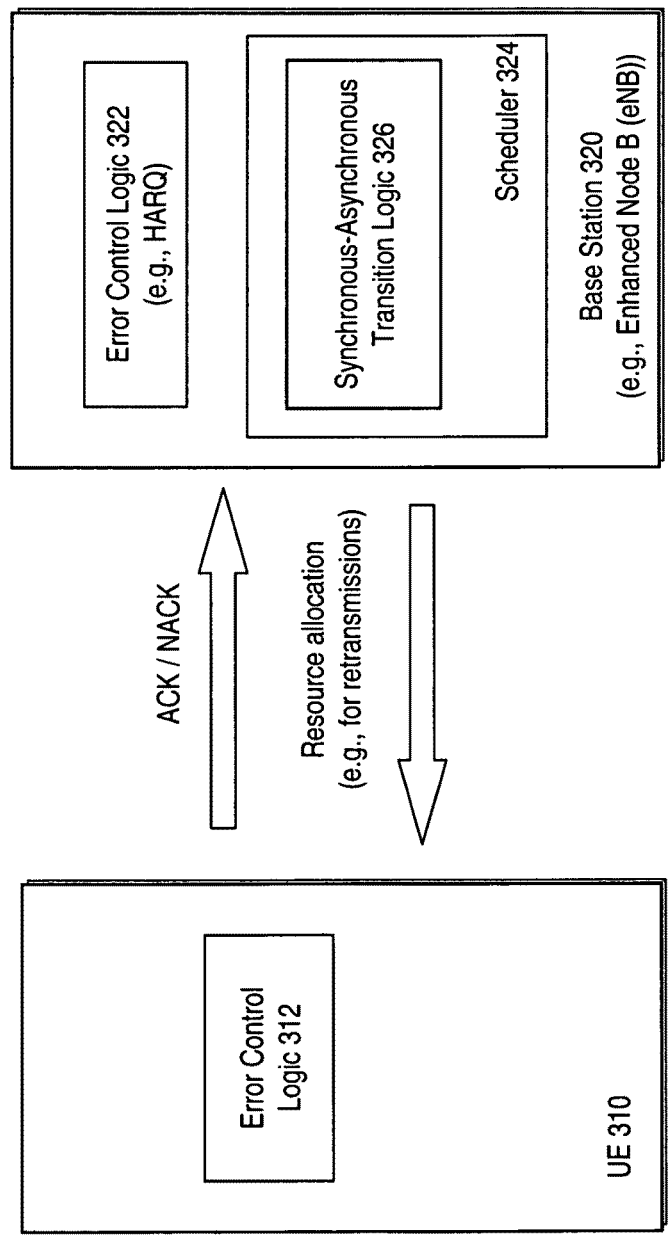
FIG. 7 is a diagram of two exemplary components capable of providing adjustable semi-synchronous retransmissions in accordance with various exemplary embodiments of the invention.
Figure 8B:
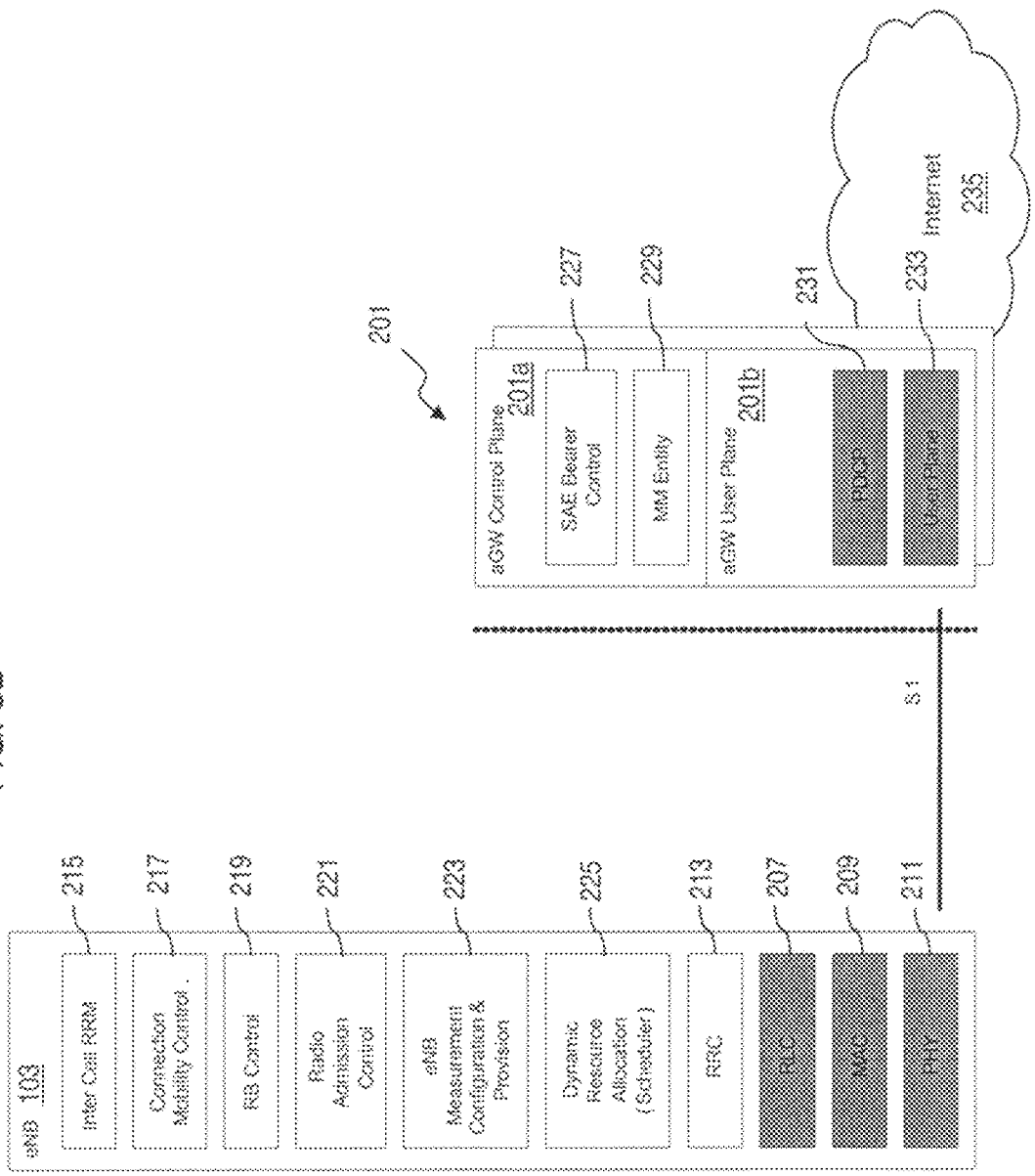

It is briefly noted that although described above in FIGS. 5A, 5B, 6A and 6B with respect to operations that, at least in some exemplary embodiments, may be separably performed by two different devices (e.g., a Node B transmitting an adjustment parameter to a UE), the exemplary embodiments of the invention are not limited thereto, and may be directed to separate aspects, such as ones performed by only one apparatus or device (e.g., the actions performed by the Node B or the actions performed by the UE), for example. As a non-limiting example, reference may be made to FIGS. 9A and 9B as discussed below. FIG. 7 is a diagram of two exemplary components capable of providing adjustable semi-synchronous retransmissions in accordance with various exemplary embodiments of the invention. As shown in FIG. 7, a UE 310 communicates (e.g., via at least one transceiver, via at least one antenna) with a base station 320 which is part of an access network (e.g., WiMAX, 3GPP LTE/E-UTRAN, etc.). Under the 3GPP LTE architecture (as shown in FIGS. 8A and 8B and further described below), the base station 320 is denoted as an eNB 320. The UE 310 can be any type of suitable mobile station, such as a handset, terminal, station, unit, device or any type of interface to the user (such as "wearable" circuitry, etc.), as non-limiting examples. Communications between the UE 310 and the eNB 320 are governed, at least in part, by control information exchanged between the two entities. Such control information, in one exemplary embodiment, comprises information concerning one or more of DRX/DTX, packet scheduling and HARQ retransmission transported over a control channel (e.g., PDCCH or PDSCCH) on the DL from the eNB 320 to the UE 310.

The UE 310 and the eNB 320 include error control logic 312, 322 configured to implement (e.g., execute) the HARQ scheme. HARQ, which combines ARQ protocols with FEC schemes, provides a sound error-control technique for wireless links. ARQ is an error detection mechanism used on the link layer. This mechanism permits the receiver to indicate to the transmitter that a packet or sub-packet has been received incorrectly, and thus, request that the transmitter resend the particular packet(s). It is recognized that one of the problems related to allocation of resources and scheduling for HARQ retransmission is that it is desirable to transmit as much as possible reusing current allocations in order to obtain power saving on the UE 310. It is further desirable to provide freedom for scheduling as much as possible without increasing power consumption (e.g., at the UE 310).

Therefore, the eNB 320 of FIG. 7 utilizes a scheduler 324 with transition logic 326 for assigning resources synchronously as well as asynchronously in providing, for example, data retransmissions (e.g., HARQ). The network assigns resources to the UE 310 using, for example, the PDCCH for scheduling of both new data transmissions and data retransmissions (e.g., HARQ and/or ARQ). In the context of LTE, various exemplary embodiments of the invention provide procedures for LTE_ACTIVE state DRX/DTX, packet scheduling and HARQ retransmission.

FIGS. 8A and 8B are diagrams of an exemplary LTE communication system 200 in which the components of FIGS. 2, 3, 4 and/or 7 (e.g., the UE 310 and/or the eNB 320) can operate in accordance with various exemplary embodiments of the invention. In FIGS. 8A and 8B, the communication system 200 utilizes a LTE architecture in accordance with various exemplary embodiments of the invention. The system 200 includes at least one UE (UEs) 101 and at least one eNB (eNBs) 103. In some exemplary embodiments, at least one of the UEs 101 comprises the UE 310 shown in FIG. 7. Similarly, in some exemplary embodiments, at least one of the eNBs 103 comprises the eNB 320 depicted in FIG. 7.

As shown in FIGS. 8A and 8B, the eNBs 103 and the UEs 101 can communicate in the system 200 using TDMA, CDMA, WCDMA, OFDMA or SC-FDMA or a combination thereof, as non-limiting examples. In one exemplary embodiment, both the UL and the DL utilize WCDMA. In another exemplary embodiment, the UL utilizes SC-FDMA while the DL utilizes OFDMA. The system 200 provides for UL transmissions that can allow for power-efficient UE transmissions in order to maximize coverage by utilizing, for example, SC-FDMA with dynamic bandwidth. In some exemplary embodiments, the system 200 can adopt OFDMA techniques for broadcast services, including services in which information is transmitted from several (e.g., synchronized) eNBs to one or more of the UEs 101.

The system 200 includes at least one aGW (aGWs) 201 and/or MME/UPE connected to the eNBs 103, for example, in a partial or full mesh configuration using tunneling over a packet service network 203 (e.g., an IP network). Exemplary functions of the aGWs 201 include distribution of paging messages to the eNBs 103, IP header compression, termination of U-plane packets for paging purposes, and switching of U-plane for support of UE mobility. Since the aGWs 201 serve as a gateway to external networks (e.g., the Internet or other private consumer networks 203), the aGWs 201 include an AAA system 205 to securely determine the identity and privileges of a user and to track each user's activities.

Reference with regard to the LTE interface may be made to 3GPP TR 25.813, V7.1.0, entitled "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," September 2006.

As shown in FIG. 8B, the eNBs 103 utilize an E-UTRA user plane (e.g., RLC 207, MAC 209, and PHY 211) as well as a control plane (e.g., RRC 213). The eNB 103 also includes the following functions: Inter Cell RRM 215, Connection Mobility Control 217, RB Control 219, Radio Admission Control 221, eNB Measurement Configuration and Provision 223, and Dynamic Resource Allocation (Scheduler) 225.

The eNB 103 communicates with the aGW 201 (Access Gateway) via an S1 interface. The aGW 201 includes a User Plane 201a and a Control plane 201b. The control plane 201b provides the following components: SAE (System Architecture Evolution) Bearer Control 227 and MM (Mobile Management) Entity 229. The user plane 201a includes a PDCP (Packet Data Convergence Protocol) 231 and a user plane 233.

One of ordinary skill in the art would recognize that the processes for resource scheduling and error control may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed above with respect to FIGS. 2, 3 and 4, as non-limiting examples.

Figure 10B:
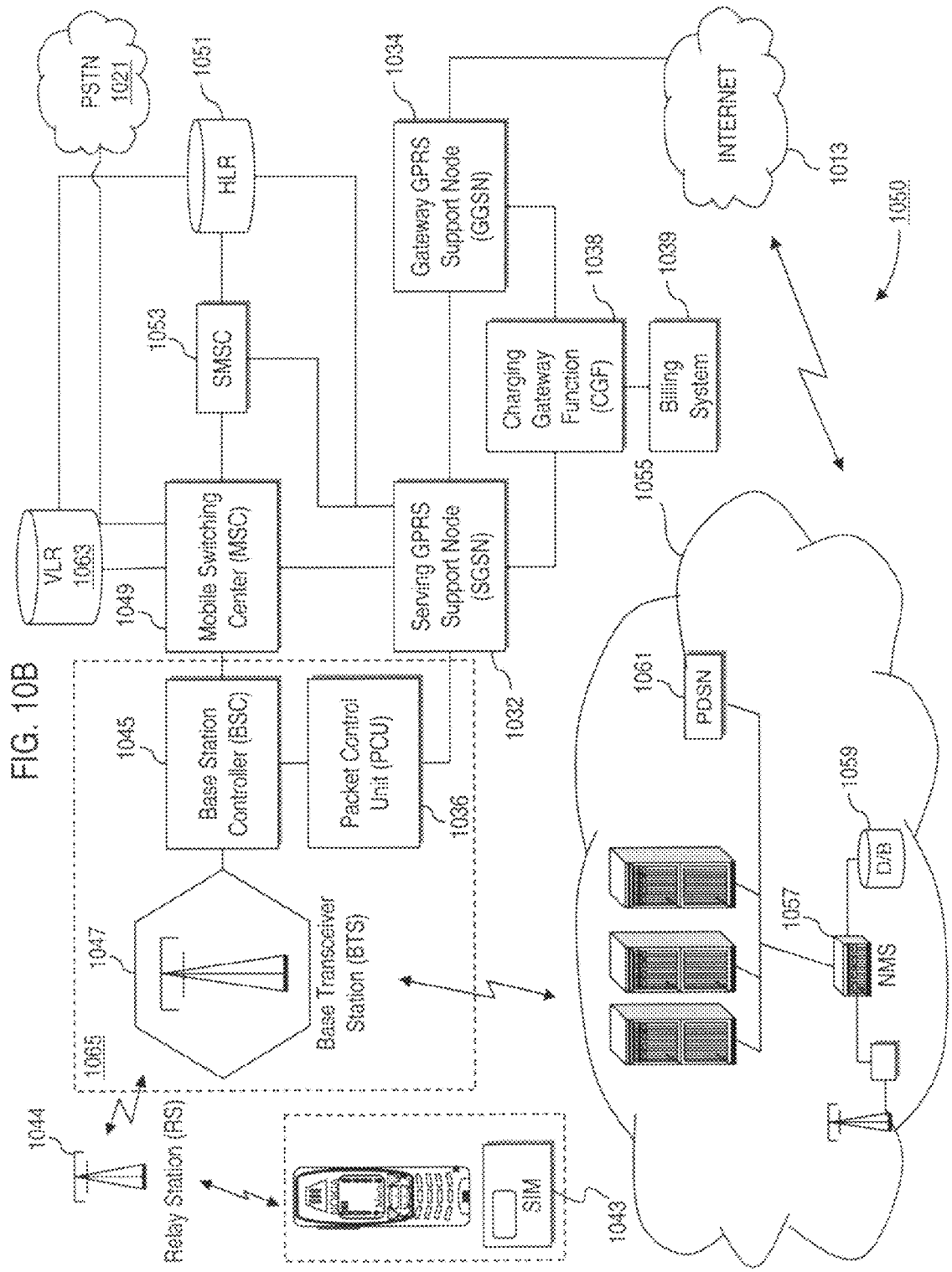

FIGS. 10A and 10B are diagrams of different exemplary cellular mobile phone systems capable of supporting various exemplary embodiments of the invention. FIGS. 10A and 10B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 1000 includes mobile stations 1001 (e.g., handsets, terminals, stations, units, devices, or any type of interface to the user (such as "wearable" circuitry, etc.)) in communication with a Base Station Subsystem (BSS) 1003 through a relay station (RS) 1004. According to one embodiment of the invention, the radio network supports Third Generation (3G) services as defined by the International Telecommunications Union (ITU) for International Mobile Telecommunications 2000 (IMT-2000).

In this example, the BSS 1003 includes a Base Transceiver Station (BTS) 1005 and Base Station Controller (BSC) 1007. Although a single BTS is shown, it is recognized that multiple BTSs are typically connected to the BSC through, for example, point-to-point links. Each BSS 1003 is linked to a Packet Data Serving Node (PDSN) 1009 through a transmission control entity, or a Packet Control Function (PCF) 1011. Since the PDSN 1009 serves as a gateway to external networks, e.g., the Internet 1013 or other private consumer networks 1015, the PDSN 1009 can include an Access, Authorization and Accounting system (AAA) 1017 to securely determine the identity and privileges of a user and to track each user's activities. The network 1015 comprises a Network Management System (NMS) 1031 linked to one or more databases 1033 that are accessed through a Home Agent (HA) 1035 secured by a Home AAA 1037.

Although a single BSS 1003 is shown, it is recognized that multiple BSSs 1003 are typically connected to a Mobile Switching Center (MSC) 1019. The MSC 1019 provides connectivity to a circuit-switched telephone network, such as the Public Switched Telephone Network (PSTN) 1021. Similarly, it is also recognized that the MSC 1019 may be connected to other MSCs 1019 on the same network 1000 and/or to other radio networks. The MSC 1019 is generally collocated with a Visitor Location Register (VLR) 1023 database that holds temporary information about active subscribers to that MSC 1019. The data within the VLR 1023 database is to a large extent a copy of the Home Location Register (HLR) 1025 database, which stores detailed subscriber service subscription information. In some implementations, the HLR 1025 and VLR 1023 are the same physical database; however, the HLR 1025 can be located at a remote location accessed through, for example, a Signaling System Number 7 (SS7) network. An Authentication Center (AuC) 1027 containing subscriber-specific authentication data, such as a secret authentication key, is associated with the HLR 1025 for authenticating users. Furthermore, the MSC 1019 is connected to a Short Message Service Center (SMSC) 1029 that stores and forwards short messages to and from the radio network 1000.

During typical operation of the cellular telephone system, BTSs 1005 receive and demodulate sets of reverse-link signals from sets of mobile units 1001 conducting telephone calls or other communications. Each reverse-link signal received by a given BTS 1005 is processed within that station. The resulting data is forwarded to the BSC 1007. The BSC 1007 provides call resource allocation and mobility management functionality including the orchestration of soft handoffs between BTSs 1005. The BSC 1007 also routes the received data to the MSC 1019, which in turn provides additional routing and/or switching for interface with the PSTN 1021. The MSC 1019 is also responsible for call setup, call termination, management of inter-MSC handover and supplementary services, and collecting, charging and accounting information. Similarly, the radio network 1000 sends forward-link messages. The PSTN 1021 interfaces with the MSC 1019. The MSC 1019 additionally interfaces with the BSC 1007, which in turn communicates with the BTSs 1005, which modulate and transmit sets of forward-link signals to the sets of mobile units 1001.

As shown in FIG. 10B, the two key elements of the General Packet Radio Service (GPRS) infrastructure 1050 are the Serving GPRS Supporting Node (SGSN) 1032 and the Gateway GPRS Support Node (GGSN) 1034. In addition, the GPRS infrastructure includes a Packet Control Unit PCU (1036) and a Charging Gateway Function (CGF) 1038 linked to a Billing System 1039. A GPRS the Mobile Station (MS) 1041 employs a Subscriber Identity Module (SIM) 1043. Under this scenario, a relay station (RS) 1044 provides extended coverage for the MS 1041.

The PCU 1036 is a logical network element responsible for GPRS-related functions such as air interface access control, packet scheduling on the air interface, and packet assembly and reassembly. Generally the PCU 1036 is physically integrated with the BSC 1045; however, it can be collocated with a BTS 1047 or a SGSN 1032. The SGSN 1032 provides equivalent functions as the MSC 1049 including mobility management, security, and access control functions but in the packet-switched domain. Furthermore, the SGSN 1032 has connectivity with the PCU 1036 through, for example, a Frame Relay-based interface using the BSS GPRS protocol (BSSGP). Although only one SGSN is shown, it is recognized that that multiple SGSNs 1031 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 1045, any given BSC 1045 generally interfaces with one SGSN 1032. Also, the SGSN 1032 is optionally connected with the HLR 1051 through an SS7-based interface using GPRS enhanced Mobile Application Part (MAP) or with the MSC 1049 through an SS7-based interface using Signaling Connection Control Part (SCCP). The SGSN/HLR interface allows the SGSN 1032 to provide location updates to the HLR 1051 and to retrieve GPRS-related subscription information within the SGSN service area. The SGSN/MSC interface enables coordination between circuit-switched services and packet data services such as paging a subscriber for a voice call. Finally, the SGSN 1032 interfaces with a SMSC 1053 to enable short messaging functionality over the network 1050.

The GGSN 1034 is the gateway to external packet data networks, such as the Internet 1013 or other private customer networks 1055. The network 1055 comprises a Network Management System (NMS) 1057 linked to one or more databases 1059 accessed through a PDSN 1061. The GGSN 1034 assigns Internet Protocol (IP) addresses and can also authenticate users acting as a Remote Authentication Dial-In User Service host. Firewalls located at the GGSN 1034 also perform a firewall function to restrict unauthorized traffic. Although only one GGSN 1034 is shown, it is recognized that a given SGSN 1032 may interface with one or more GGSNs 1033 to allow user data to be tunneled between the two entities as well as to and from the network 1050. When external data networks initialize sessions over the GPRS network 1050, the GGSN 1034 queries the HLR 1051 for the SGSN 1032 currently serving a MS 1041.

The BTS 1047 and BSC 1045 manage the radio interface, including controlling which Mobile Station (MS) 1041 has access to the radio channel at what time. These elements essentially relay messages between the MS 1041 and SGSN 1032. The SGSN 1032 manages communications with an MS 1041, sending and receiving data and keeping track of its location. The SGSN 1032 also registers the MS 1041, authenticates the MS 1041, and encrypts data sent to the MS 1041.

Figure 11:
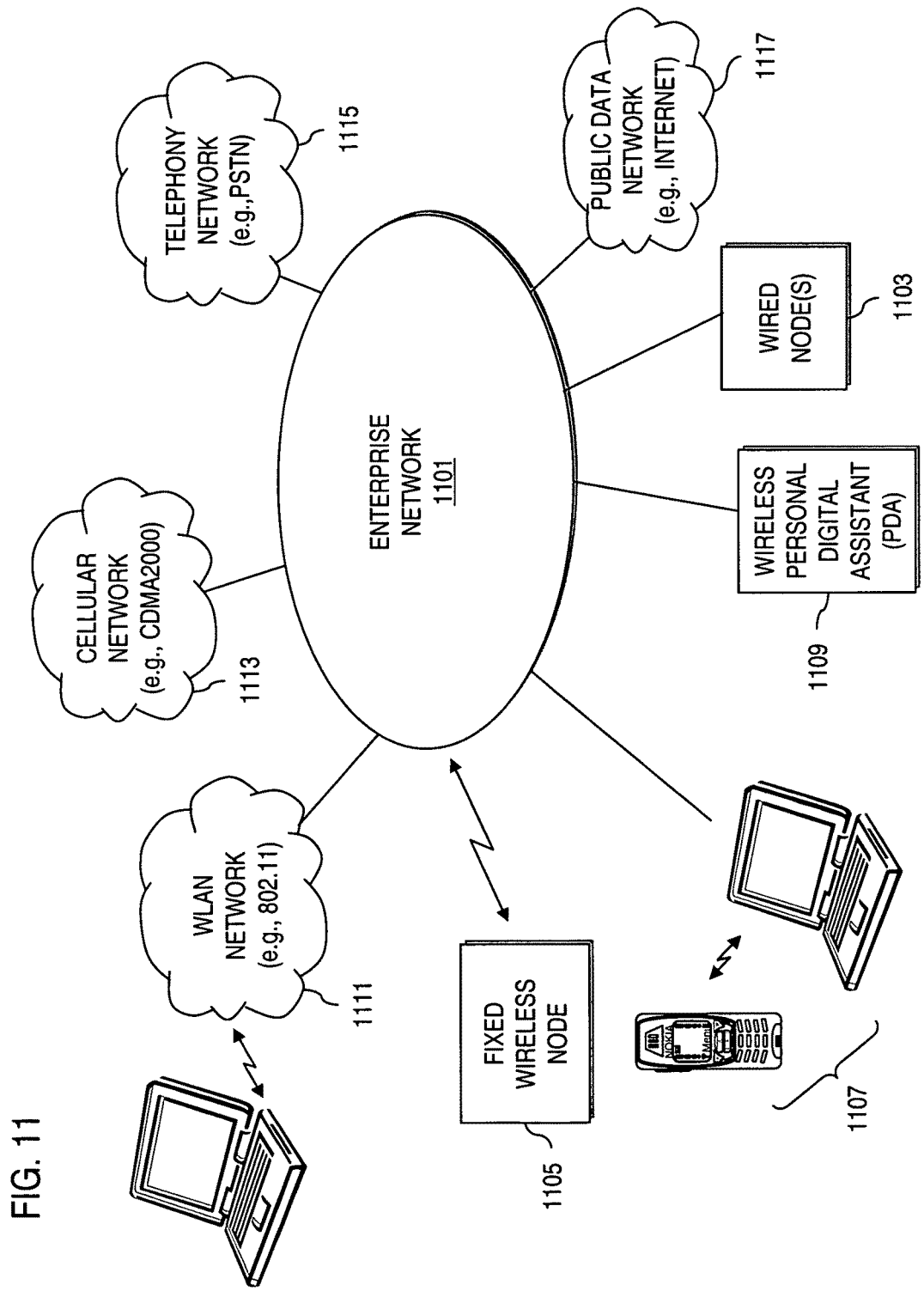
FIG. 11 shows an exemplary enterprise network within which exemplary embodiments of the invention may be implemented.

FIG. 11 shows an exemplary enterprise network within which exemplary embodiments of the invention may be implemented. The exemplary enterprise network of FIG. 11 can be any type of data communication network utilizing packet-based and/or cell-based technologies (e.g., Asynchronous Transfer Mode (ATM), Ethernet, IP-based, etc.). The enterprise network 1101 provides connectivity for wired nodes 1103 as well as wireless nodes 1105-1109 (fixed or mobile), which are each configured to perform the processes described above. The enterprise network 1101 can communicate with a variety of other networks, such as a WLAN network 1111 (e.g., IEEE 802.11), a cdma2000 cellular network 1113, a telephony network 1116 (e.g., PSTN), or a public data network 1117 (e.g., Internet).

Therefore, according to an exemplary embodiment, a method comprises receiving an acknowledgement message from a user equipment according to a synchronous transmission scheme. The method also comprises notifying the user equipment of an adjustment parameter for transitioning to an asynchronous transmission scheme from the synchronous transmission scheme.

According to one aspect of the exemplary embodiment, the adjustment parameter specifies a timing duration for the user equipment to listen for resource scheduling.

According to one aspect of the exemplary embodiment, the notification is provided according to a signaling protocol that includes either RRC (Radio Resource Control) signaling or SIB (System Information Block) signaling.

According to one aspect of the exemplary embodiment, the acknowledgement message is generated according to an error control scheme.

According to one aspect of the exemplary embodiment, the error control scheme includes a Hybrid Automatic Repeat Request (HARQ) scheme.

According to another aspect of the exemplary embodiment, the method further comprises generating an allocation table for transmission over a dedicated channel. The dedicated channel includes a physical downlink shared control channel (PDSCCH).

According to another aspect of the exemplary embodiment, the acknowledgment message is received over a radio communication network compliant with a long term evolution (LTE)-compliant architecture.

According to another exemplary embodiment, an apparatus comprises an error control logic configured to receive an acknowledgement message from a user equipment according to a synchronous transmission scheme. The apparatus also comprises a scheduler coupled to the error control logic. The apparatus further comprises logic configured to notify the user equipment of an adjustment parameter for transitioning to an asynchronous transmission scheme from the synchronous transmission scheme.

According to one aspect of the exemplary embodiments, the apparatus is a base station, and the user equipment is a handset.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments wherever practicable.

(1) In one exemplary embodiment, and as illustrated in FIG. 9A, a method comprising: receiving an initial transmission of information from an apparatus (901); and receiving a retransmission of the information from the apparatus, where the retransmission is received within a window of time having a predetermined duration, where the window of time is arranged to begin at a predetermined time or after a predetermined time interval (902).

A method as in the previous, further comprising: transmitting a negative indication towards the apparatus, where the negative indication corresponds to an incorrect reception of the initial transmission, where the negative indication is transmitted subsequent to reception of the initial transmission and prior to reception of the retransmission. A method as in any above, where the predetermined duration of the window of time is measured using a discontinuous reception (DRX) retransmission timer configured to specify a maximum number of consecutive physical downlink control channel (PDCCH) subframes within which the retransmission is to be received. A method as in any above, where the predetermined time or the predetermined time interval is measured using a hybrid automatic repeat-request (HARQ) RTT timer configured to specify a minimum number of subframes before the retransmission is to be received. A method as in any above, where the method is performed within an evolved universal terrestrial radio access network.

A method as in any above, further comprising: transmitting a negative indication towards the apparatus. A method as in any above, further comprising: transmitting a negative indication towards the apparatus, where the negative indication corresponds to an incorrect reception of the initial transmission. A method as in any above, further comprising: transmitting a negative indication towards the apparatus, where the negative indication corresponds to the initial transmission of the information. A method as in any above, where the initial transmission of the information is incorrectly received. A method as in any above, where the predetermined time or the predetermined time interval is measured from the initial reception of the information. A method as in any above, where the predetermined time or the predetermined time interval is measured from the transmission of the negative indication. A method as in any above, further comprising: storing the information received via the retransmission.

A method as in any above, further comprising: transmitting a positive indication (e.g., an ACK) in response to successful reception of the retransmitted information. A method as in any above, where the method is implemented by a UE that utilizes DRX. A method as in any above, further comprising: measuring the predetermined duration, the predetermined time and/or the predetermined time interval. A method as in any above, where at least one timer is used to measure the predetermined duration, the predetermined time and/or the predetermined time interval. A method as in any above, further comprising: determining the predetermined duration, the predetermined time and/or the predetermined time interval (e.g., using one or more timers or values). A method as in any above, further comprising: receiving one or more parameters or values, where the one or more parameters or values is indicative of the predetermined duration, the predetermined time and/or the predetermined time interval.

A method as in any above, where the retransmission comprises a DL retransmission. A method as in any above, where the retransmission comprises a HARQ retransmission. A method as in any above, where the retransmission comprises a DL HARQ retransmission. A method as in any above, where one or more parameters or values is indicative of the predetermined time and/or the predetermined time interval. A method as in any above, where the negative indication comprises a NACK.

A method as in any above, where the predetermined duration of the window of time is measured using a discontinuous reception (DRX) retransmission timer. A method as in any above, where the predetermined duration of the window of time is measured using a discontinuous reception (DRX) retransmission timer configured to specify a number of subframes within which the retransmission is to be received. A method as in any above, where the predetermined duration of the window of time is measured using a discontinuous reception (DRX) retransmission timer configured to specify a maximum number of subframes within which the retransmission is to be received. A method as in any above, where the predetermined duration of the window of time is measured using a discontinuous reception (DRX) retransmission timer configured to specify a maximum number of consecutive subframes within which the retransmission is to be received. A method as in any above, where the predetermined duration of the window of time is measured using a discontinuous reception (DRX) retransmission timer configured to specify a maximum number of physical downlink control channel (PDCCH) subframes within which the retransmission is to be received. A method as in any above, where the predetermined duration is a function of the SFN.

A method as in any above, where the predetermined time or the predetermined time interval is measured using a hybrid automatic repeat-request (HARQ) RTT timer. A method as in any above, where the predetermined time or the predetermined time interval is measured using a hybrid automatic repeat-request (HARQ) RTT timer configured to specify a number of subframes before the retransmission is to be received. A method as in any above, where the predetermined time or the predetermined time interval is measured using a hybrid automatic repeat-request (HARQ) RTT timer configured to specify a minimum number of subframes before the retransmission is to be received. A method as in any above, where the predetermined time or the predetermined time interval is measured using a hybrid automatic repeat-request (HARQ) RTT timer configured to specify a minimum number of PDCCH subframes before the retransmission is to be received. A method as in any above, where the predetermined time or the predetermined time interval is a function of the SFN.

A method as in any above, further comprising one or more additional aspects of the exemplary embodiments of the invention as described in further detail herein.

(2) In another exemplary embodiment, a program storage device readable by a machine, tangibly embodying a program of instructions executable by the machine for performing operations, said operations comprising: receiving an initial transmission of information from an apparatus; and receiving a retransmission of the information from the apparatus, where the retransmission is received within a window of time having a predetermined duration, where the window of time is arranged to begin at a predetermined time or after a predetermined time interval.

A program storage device as in the previous, the operations further comprising: transmitting a negative indication towards the apparatus, where the negative indication corresponds to an incorrect reception of the initial transmission, where the negative indication is transmitted subsequent to reception of the initial transmission and prior to reception of the retransmission. A program storage device as in any above, where the predetermined duration of the window of time is measured using a discontinuous reception (DRX) retransmission timer configured to specify a maximum number of consecutive physical downlink control channel (PDCCH) subframes within which the retransmission is to be received. A program storage device as in any above, where the predetermined time or the predetermined time interval is measured using a hybrid automatic repeat-request (HARQ) RTT timer configured to specify a minimum number of subframes before the retransmission is to be received. A program storage device as in any above, where the machine comprises a node of an evolved universal terrestrial radio access network.

A program storage device as in any above, further comprising one or more additional aspects of the exemplary embodiments of the invention as described in further detail herein, including those described above with respect to (1).

(3) In another exemplary embodiment, an apparatus comprising: a receiver configured to receive an initial transmission from another apparatus and to receive a retransmission of the information from the apparatus, where the retransmission is received within a window of time having a predetermined duration, where the window of time is arranged to begin at a predetermined time or after a predetermined time interval; and a memory configured to store the information received via the retransmission.

An apparatus as in the previous, further comprising a transmitter configured to send a negative indication towards the other apparatus, where the negative indication corresponds to an incorrect reception of the initial transmission, where the negative indication is transmitted subsequent to reception of the initial transmission and prior to reception of the retransmission. An apparatus as in any above, where the predetermined duration of the window of time is measured using a discontinuous reception (DRX) retransmission timer configured to specify a maximum number of consecutive physical downlink control channel (PDCCH) subframes within which the retransmission is to be received. An apparatus as in any above, where the predetermined time or the predetermined time interval is measured using a hybrid automatic repeat-request (HARQ) RTT timer configured to specify a minimum number of subframes before the retransmission is to be received. An apparatus as in any above, where the apparatus comprises a node of an evolved universal terrestrial radio access network. An apparatus as in any above, where the apparatus comprises a mobile station.

An apparatus as in any above, further comprising one or more additional aspects of the exemplary embodiments of the invention as described in further detail herein, including those described above in (1) (e.g., implemented by one or more suitable components and/or means) and (3).

(4) In another exemplary embodiment, an apparatus comprising: first means for receiving an initial transmission of information from another apparatus; and second means for receiving a retransmission of the information from the other apparatus, where the retransmission is received within a window of time having a predetermined duration, where the window of time is arranged to begin at a predetermined time or after a predetermined time interval.

An apparatus as in the previous, further comprising: means for transmitting a negative indication towards the apparatus, where the negative indication corresponds to an incorrect reception of the initial transmission, where the negative indication is transmitted subsequent to reception of the initial transmission and prior to reception of the retransmission. An apparatus as in any above, where the predetermined duration of the window of time is measured using a discontinuous reception (DRX) retransmission timer configured to specify a maximum number of consecutive physical downlink control channel (PDCCH) subframes within which the retransmission is to be received. An apparatus as in any above, where the predetermined time or the predetermined time interval is measured using a hybrid automatic repeat-request (HARQ) RTT timer configured to specify a minimum number of subframes before the retransmission is to be received. An apparatus as in any above, where the apparatus comprises a node of an evolved universal terrestrial radio access network. An apparatus as in any above, where the apparatus comprises a mobile station.

An apparatus as in any above, where the means for transmitting comprises a transmitter. An apparatus as in any above, where the first means for receiving comprises a receiver. An apparatus as in any above, where the second means for receiving comprises a receiver. An apparatus as in any above, where the first means for receiving comprises the second means for receiving. An apparatus as in any above, where the means for transmitting, the first means for receiving and the second means for receiving comprise a transceiver. An apparatus as in any above, where the apparatus comprises a mobile node, a mobile terminal, a user equipment, a mobile phone or a cellular phone. An apparatus as in any above, further comprising means for storing the information received via the second means for receiving. An apparatus as in any above, where the means for storing comprises a memory.

An apparatus as in any above, further comprising one or more additional aspects of the exemplary embodiments of the invention as described in further detail herein, including those described above in (1) (e.g., implemented by one or more suitable components and/or means) and (3).

(5) In another exemplary embodiment, an apparatus comprising: first reception circuitry configured to receive an initial transmission of information from another apparatus; and second reception circuitry configured to receive a retransmission of the information from the other apparatus, where the retransmission is received by the second reception circuitry within a window of time having a predetermined duration, where the window of time is arranged to begin at a predetermined time or after a predetermined time interval.

An apparatus as in the previous, further comprising: transmission circuitry configured to transmit a negative indication towards the other apparatus, where the negative indication corresponds to an incorrect reception of the initial transmission, where the negative indication is transmitted subsequent to reception of the initial transmission and prior to reception of the retransmission. An apparatus as in any above, where the predetermined duration of the window of time is measured using a discontinuous reception (DRX) retransmission timer configured to specify a maximum number of consecutive physical downlink control channel (PDCCH) subframes within which the retransmission is to be received. An apparatus as in any above, where the predetermined time or the predetermined time interval is measured using a hybrid automatic repeat-request (HARQ) RTT timer configured to specify a minimum number of subframes before the retransmission is to be received.

An apparatus as in any above, where the apparatus comprises a node of an evolved universal terrestrial radio access network. An apparatus as in any above, where the apparatus comprises a mobile station. An apparatus as in any above, further comprising storage circuitry configure to store the information received via the retransmission by the second reception circuitry. An apparatus as in any above, wherein the first reception circuitry comprises the second reception circuitry. An apparatus as in any above, wherein the apparatus is embodied in at least one integrated circuit, at least one chip or at least one circuit board. An apparatus as in any above, further comprising one or more additional aspects of the exemplary embodiments of the invention as described in further detail herein.

(6) In another exemplary embodiment, and as depicted in FIG. 9B, a method comprising: (initially) transmitting information from a first apparatus towards a second apparatus (951); and retransmitting the information from the first apparatus towards the second apparatus, where the retransmission is performed within a window of time having a predetermined duration, where the window of time is arranged to begin at a predetermined time or after a predetermined time interval (952).

A method as in the previous, where the retransmission is performed in response to the first apparatus receiving a negative indication from the second apparatus. A method as in any above, where a first parameter indicative of the predetermined duration of the window of time is configured to specify a maximum number of consecutive physical downlink control channel (PDCCH) subframes within which the retransmission is to be transmitted. A method as in any above, where a second parameter indicative of the predetermined time or the predetermined time interval is configured to specify a minimum number of subframes before the retransmission is to be transmitted. A method as in any above, where the method is performed within an evolved universal terrestrial radio access network.

A method as in any above, further comprising: receiving a negative indication from the second apparatus. A method as in any above, further comprising: receiving a negative indication from the second apparatus, where the negative indication corresponds to an incorrect reception of the initial transmission. A method as in any above, further comprising: receiving a negative indication from the second apparatus, where the negative indication corresponds to the initial transmission of the information. A method as in any above, where the initial transmission of the information is incorrectly received by the second apparatus. A method as in any above, where the predetermined time or the predetermined time interval is measured from the initial transmission of the information. A method as in any above, where the predetermined time or the predetermined time interval is measured from the reception of the negative indication. A method as in any above, further comprising: storing the information (e.g., prior to transmission or retransmission).

A method as in any above, further comprising: receiving a positive indication (e.g., an ACK). A method as in any above, further comprising: receiving a positive indication (e.g., an ACK) in response to successful reception of the retransmitted information by the second apparatus. A method as in any above, where the second apparatus comprises a UE that utilizes DRX. A method as in any above, further comprising: measuring the predetermined duration, the predetermined time and/or the predetermined time interval. A method as in any above, where at least one timer is used to measure the predetermined duration, the predetermined time and/or the predetermined time interval. A method as in any above, further comprising: determining the predetermined duration, the predetermined time and/or the predetermined time interval (e.g., using one or more timers or values). A method as in any above, further comprising: transmitting one or more parameters or values from the first apparatus towards the second apparatus, where the one or more parameters or values is indicative of the predetermined duration, the predetermined time and/or the predetermined time interval.

A method as in any above, where the retransmission comprises a DL retransmission. A method as in any above, where the retransmission comprises a HARQ retransmission. A method as in any above, where the retransmission comprises a DL HARQ retransmission. A method as in any above, where one or more parameters or values is indicative of the predetermined duration, the predetermined time and/or the predetermined time interval. A method as in any above, where the negative indication comprises a NACK.

A method as in any above, where the predetermined duration of the window of time is measured using a discontinuous reception (DRX) retransmission timer. A method as in any above, where the predetermined duration of the window of time is measured using a discontinuous reception (DRX) retransmission timer configured to specify a number of subframes within which the retransmission is to be received. A method as in any above, where the predetermined duration of the window of time is measured using a discontinuous reception (DRX) retransmission timer configured to specify a maximum number of subframes within which the retransmission is to be received. A method as in any above, where the predetermined duration of the window of time is measured using a discontinuous reception (DRX) retransmission timer configured to specify a maximum number of consecutive subframes within which the retransmission is to be received. A method as in any above, where the predetermined duration of the window of time is measured using a discontinuous reception (DRX) retransmission timer configured to specify a maximum number of physical downlink control channel (PDCCH) subframes within which the retransmission is to be received. A method as in any above, where the predetermined duration is a function of the SFN.

A method as in any above, where the predetermined time or the predetermined time interval is measured using a hybrid automatic repeat-request (HARQ) RTT timer. A method as in any above, where the predetermined time or the predetermined time interval is measured using a hybrid automatic repeat-request (HARQ) RTT timer configured to specify a number of subframes before the retransmission is to be received. A method as in any above, where the predetermined time or the predetermined time interval is measured using a hybrid automatic repeat-request (HARQ) RTT timer configured to specify a minimum number of subframes before the retransmission is to be received. A method as in any above, where the predetermined time or the predetermined time interval is measured using a hybrid automatic repeat-request (HARQ) RTT timer configured to specify a minimum number of PDCCH subframes before the retransmission is to be received. A method as in any above, where the predetermined time or the predetermined time interval is a function of the SFN.

A method as in any above, further comprising one or more additional aspects of the exemplary embodiments of the invention as described in further detail herein.

(7) In another exemplary embodiment, a program storage device readable by a machine, tangibly embodying a program of instructions executable by the machine for performing operations, said operations comprising: transmitting information from the machine towards an apparatus; and retransmitting the information from the machine towards the apparatus, where the retransmission is performed within a window of time having a predetermined duration, where the window of time is arranged to begin at a predetermined time or after a predetermined time interval.

A program storage device as in the previous, where the retransmission is performed in response to the machine receiving a negative indication from the apparatus. A program storage device as in any above, where a first parameter indicative of the predetermined duration of the window of time is configured to specify a maximum number of consecutive physical downlink control channel (PDCCH) subframes within which the retransmission is to be transmitted. A program storage device as in any above, where a second parameter indicative of the predetermined time or the predetermined time interval is configured to specify a minimum number of subframes before the retransmission is to be transmitted. A program storage device as in any above, where the machine comprises a node of an evolved universal terrestrial radio access network.

A program storage device as in any above, further comprising one or more additional aspects of the exemplary embodiments of the invention as described in further detail herein, including those described above with respect to (6).

(8) In another exemplary embodiment, an apparatus comprising: a memory configured to store information; and a transmitter configured to transmit the information from the apparatus towards another apparatus and to retransmit the information from the apparatus towards the other apparatus, where the retransmission is performed within a window of time having a predetermined duration, where the window of time is arranged to begin at a predetermined time or after a predetermined time interval.

An apparatus as in the previous, further comprising a receiver, where the retransmission by the transmitter is performed in response to the receiver receiving a negative indication from the other apparatus. An apparatus as in any above, where a first parameter indicative of the predetermined duration of the window of time is configured to specify a maximum number of consecutive physical downlink control channel (PDCCH) subframes within which the retransmission is to be transmitted by the transmitter. An apparatus as in any above, where a second parameter indicative of the predetermined time or the predetermined time interval is configured to specify a minimum number of subframes before the retransmission is to be transmitted by the transmitter. An apparatus as in any above, where the apparatus comprises a node of an evolved universal terrestrial radio access network. An apparatus as in any above, where the apparatus comprises a base station.

An apparatus as in any above, further comprising one or more additional aspects of the exemplary embodiments of the invention as described in further detail herein, including those described above with respect to (6) (e.g., implemented by one or more suitable components and/or means) and (8).

(9) In another exemplary embodiment, an apparatus comprising: means for transmitting information from the apparatus towards a second apparatus; and means for retransmitting the information from the apparatus towards the second apparatus, where the retransmission is performed within a window of time having a predetermined duration, where the window of time is arranged to begin at a predetermined time or after a predetermined time interval.

An apparatus as in the previous, further comprising means for receiving a negative indication from the other apparatus, where the retransmission is performed by the means for retransmission in response to the negative indication being received from the other apparatus by the means for receiving. An apparatus as in any above, where a first parameter indicative of the predetermined duration of the window of time is configured to specify a maximum number of consecutive physical downlink control channel (PDCCH) subframes within which the retransmission is to be transmitted by the means for retransmitting. An apparatus as in any above, where a second parameter indicative of the predetermined time or the predetermined time interval is configured to specify a minimum number of subframes before the retransmission is to be transmitted by the means for retransmitting. An apparatus as in any above, where the apparatus comprises a node of an evolved universal terrestrial radio access network. An apparatus as in any above, where the apparatus comprises a base station.

An apparatus as in any above, where the means for receiving comprises a receiver. An apparatus as in any above, where the means for transmitting comprises a transmitter. An apparatus as in any above, where the means for retransmitting comprises a transmitter. An apparatus as in any above, where the means for transmitting comprises the means for retransmitting. An apparatus as in any above, where the means for transmitting, the means for retransmitting and the means for receiving comprise a transceiver. An apparatus as in any above, where the apparatus comprises an access node, a Node B, an eNode B or a network node. An apparatus as in any above, further comprising means for storing the information. An apparatus as in any above, where the means for storing comprises a memory.

An apparatus as in any above, further comprising one or more additional aspects of the exemplary embodiments of the invention as described in further detail herein, including those described above with respect to (6) (e.g., implemented by one or more suitable components and/or means) and (8).

(10) In another exemplary embodiment, an apparatus comprising: transmission circuitry configured to transmit information from the apparatus towards a second apparatus; and retransmission circuitry configured to retransmit the information from the apparatus towards the second apparatus, where the retransmission is performed within a window of time having a predetermined duration, where the window of time is arranged to begin at a predetermined time or after a predetermined time interval.

An apparatus as in the previous, further comprising: reception circuitry configured to receive a negative indication from the second apparatus, where the retransmission is performed by the retransmission circuitry in response to the negative indication being received from the second apparatus by the reception circuitry. An apparatus as in any above, where the predetermined duration of the window of time is measured using a discontinuous reception (DRX) retransmission timer configured to specify a maximum number of consecutive physical downlink control channel (PDCCH) subframes within which the retransmission is to be received. An apparatus as in any above, where the predetermined time or the predetermined time interval is measured using a hybrid automatic repeat-request (HARQ) RTT timer configured to specify a minimum number of subframes before the retransmission is to be received.

An apparatus as in any above, where the apparatus comprises a node of an evolved universal terrestrial radio access network. An apparatus as in any above, where the apparatus comprises a base station or an access node. An apparatus as in any above, further comprising storage circuitry configure to store the information transmitted by the transmission circuitry. An apparatus as in any above, wherein the transmission circuitry comprises the retransmission circuitry. An apparatus as in any above, wherein the apparatus is embodied in at least one integrated circuit, at least one chip or at least one circuit board. An apparatus as in any above, further comprising one or more additional aspects of the exemplary embodiments of the invention as described in further detail herein.

(11) In another exemplary embodiment, a system comprising: a first apparatus comprising a first memory and a first transmitter; and a second apparatus comprising a second receiver and a second memory, where the first memory is configured to store information, where the first transmitter is configured to transmit the stored information from the first apparatus towards the second apparatus and to retransmit the information from the first apparatus towards the second apparatus, where the retransmission is performed within a window of time having a predetermined duration, where the window of time is arranged to begin at a predetermined time or after a predetermined time interval, where the second receiver is configured to receive the transmission of the information from the second apparatus and to receive the retransmission of the information from the second apparatus, where the second memory is configured to store the information received via the retransmission.

A system as in the previous, further comprising one or more additional aspects of the exemplary embodiments of the invention as described in further detail herein.

(12) In another exemplary embodiment, a system comprising: a first apparatus comprising means for transmitting and means for retransmitting; and a second apparatus comprising first means for receiving and second means for receiving, where the means for transmitting is for transmitting information from the first apparatus towards the second apparatus, where the means for retransmitting is for retransmitting the information from the first apparatus towards the second apparatus, where the retransmission is performed within a window of time having a predetermined duration, where the window of time is arranged to begin at a predetermined time or after a predetermined time interval, where the first means for receiving is for receiving the transmission of information from the first apparatus, where the second means for receiving is for receiving the retransmission of the information from the first apparatus.

A system as in the previous, further comprising one or more additional aspects of the exemplary embodiments of the invention as described in further detail herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

While exemplary embodiments of the invention have been described in connection with a number of exemplary embodiments and exemplary implementations, the exemplary embodiments of the invention are not so limited but further may cover various modifications and equivalent arrangements, which fall within the purview of the appended claims. Although features of the exemplary embodiments of the invention are expressed in certain combinations among the claims, it is contemplated that these features can be arranged in any suitable or practicable combination and order.

Still further, the various names used for parameters and/or timers (e.g., HARQ RTT Timer, DRX Retransmission Timer, etc.) are not intended to be limiting in any respect, as these parameters may be identified by any suitable names.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention. For example, while described above in reference to DL retransmission, the exemplary embodiments of the invention are not limited thereto and may be utilized in conjunction with other forms of retransmission, such as UL retransmission or retransmissions that occur between a UE and a relay node or another UE, for example. Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving, at a first apparatus, an initial transmission of information from a second apparatus;
tracking, at the first apparatus, a passage of time before a possible retransmission of the information from the second apparatus is expected; and
receiving, at the first apparatus, a retransmission of the information from the second apparatus, where the retransmission is received within a window of time specified by one or more parameters signaled to the first apparatus from the second apparatus and having a predetermined duration, where the window of time is arranged to begin at a predetermined time or after a predetermined time interval that is tracked, where the first apparatus expects the possible retransmission of the initial transmission of the information from the second apparatus occurs only during the window of time specified by the one or more parameters signaled from the second apparatus so that the first apparatus can at least one of utilize discontinuous reception and know when the possible retransmission of the initial transmission of the information from the second apparatus will occur, where the predetermined duration of the window of time is measured using a discontinuous reception (DRX) retransmission timer configured to specify a maximum number of consecutive physical downlink control channel (PDCCH) subframes within which the retransmission is to be received, and the predetermined time or the predetermined time interval is measured using a hybrid automatic repeat-request (HARQ) RTT timer configured to specify a minimum number of subframes before the retransmission is to be received.

2. The method according to claim 1, wherein the second apparatus configures the transmission window and signals information about the transmission window to the first apparatus prior to the possible retransmission.

3. The method according to claim 1, wherein the one or more parameters are specified to both the first apparatus and second apparatus prior to the possible retransmission.

4. A non-transitory computer-readable medium storing a program of instructions executable by a machine for performing operations, said operations comprising:
receiving, at a first apparatus, an initial transmission of information from a second apparatus;
tracking, at the first apparatus, a passage of time before a possible retransmission of the information from the second apparatus is expected; and
receiving, at the first apparatus, a retransmission of the information from the second apparatus, where the retransmission is received within a window of time specified by one or more parameters signaled to the first apparatus from the second apparatus and having a predetermined duration, where the window of time is arranged to begin at a predetermined time or after a predetermined time interval that is tracked, where the first apparatus expects the possible retransmission of the information from the second apparatus occurs only during the window of time specified by the one or more parameters signaled from the second apparatus so that the first apparatus can at least one of utilize discontinuous reception and know when the possible retransmission of the initial transmission of the information from the second apparatus will occur, where the predetermined duration of the window of time is measured using a discontinuous reception (DRX) retransmission timer configured to specify a maximum number of consecutive physical downlink control channel (PDCCH) subframes within which the retransmission is to be received, and the predetermined time or the predetermined time interval is measured using a hybrid automatic repeat-request (HARQ) RTT timer configured to specify a minimum number of subframes before the retransmission is to be received.

5. The non-transitory computer-readable medium according to claim 4, wherein the second apparatus configures the transmission window and signals information about the transmission window to the first apparatus prior to the possible retransmission.

6. The non-transitory computer-readable medium according to claim 4, wherein the one or more parameters are specified to both the first apparatus and second apparatus prior to the possible retransmission.

7. An apparatus comprising:
a processor; and
a memory including computer program instructions, the memory and the computer program instructions being configured to, with the processor, cause the apparatus at least to perform:
receive, at the apparatus, an initial transmission from another apparatus;
track, at the apparatus, a passage of time before a possible retransmission of the information from the other apparatus is expected; and
receive, at the apparatus, a retransmission of the information from the other apparatus, where the retransmission is received within a window of time specified by one or more parameters signaled to the apparatus from the other apparatus and having a predetermined duration, where the window of time is arranged to begin at a predetermined time or after a predetermined time interval that is tracked, where the apparatus expects the possible retransmission of the initial transmission of the information from the other apparatus can occur during the window of time specified by the one or more parameters signaled from the second apparatus so that the first apparatus can at least one of utilize discontinuous reception and know when the possible retransmission of the initial transmission of the information from the second apparatus will occur, where the predetermined duration of the window of time is measured using a discontinuous reception (DRX) retransmission timer configured to specify a maximum number of consecutive physical downlink control channel (PDCCH) subframes within which the retransmission is to be received, and the predetermined time or the predetermined time interval is measured using a hybrid automatic repeat-request (HARQ) RTT timer configured to specify a minimum number of subframes before the retransmission is to be received.

8. The apparatus according to claim 7, wherein the other apparatus configures the transmission window and signals information about the transmission window to the apparatus prior to the possible retransmission.

9. The apparatus according to claim 7, wherein the one or more parameters are specified to both the apparatus and other apparatus prior to the possible retransmission.

10. An apparatus comprising:
first means for receiving, at the apparatus, an initial transmission of information from another apparatus;
means for tracking, at the apparatus, a passage of time before a possible retransmission of the information from the other apparatus is expected; and
second means for receiving, at the apparatus, a retransmission of the information from the other apparatus, where the retransmission is received within a window of time specified by one or more parameters signaled to the apparatus from the other apparatus and having a predetermined duration, where the window of time is arranged to begin at a predetermined time or after a predetermined time interval that is tracked, where the first apparatus expects the possible retransmission of the initial transmission of the information from the other apparatus occurs only during the window of time specified by the one or more parameters signaled from the second apparatus so that the first apparatus can at least one of utilize discontinuous reception and know when the possible retransmission of the initial transmission of the information from the second apparatus will occur, where the predetermined duration of the window of time is measured using a discontinuous reception (DRX) retransmission timer configured to specify a maximum number of consecutive physical downlink control channel (PDCCH) subframes within which the retransmission is to be received, and the predetermined time or the predetermined time interval is measured using a hybrid automatic repeat-request (HARQ) RTT timer configured to specify a minimum number of subframes before the retransmission is to be received.

11. The apparatus according to claim 10, wherein the other apparatus configures the transmission window and signals information about the transmission window to the apparatus prior to the possible retransmission.

12. The apparatus according to claim 10, wherein the one or more parameters are specified to both the apparatus and other apparatus prior to the possible retransmission.

* * * * *